United States Patent [19]
Ai et al.

[11] Patent Number: 5,502,566
[45] Date of Patent: Mar. 26, 1996

[54] METHOD AND APPARATUS FOR ABSOLUTE OPTICAL MEASUREMENT OF ENTIRE SURFACES OF FLATS

[75] Inventors: Chiayu Ai; James C. Wyant; Lian-Zhen Shao; Robert E. Parks, all of Tucson, Ariz.

[73] Assignee: Wyko Corporation, Tucson, Ariz.

[21] Appl. No.: 387,635

[22] Filed: Feb. 13, 1995

Related U.S. Application Data

[63] Continuation of Ser. No. 97,168, Jul. 23, 1993, abandoned.

[51] Int. Cl.$^6$ .................................................... G01B 9/02
[52] U.S. Cl. .................................................................. 356/359
[58] Field of Search .................................... 356/359, 360, 356/345, 357

[56] References Cited

PUBLICATIONS

"Absolute Flatness Testing by the Rotation Method with Optimal Measuring Error Compensation", by G. Shulz and J. Grzanna, Applied Optics, Jul. 1992, vol. 31, No. 19, pp. 3767–3780.

"Absolute Flatness Testing by an Extended Rotation Method using Two Angles of Rotation" by G. Schulz Applied Optics Mar. 1993, vol. 32, No. 7 pp. 1055–1059.

"Ein Interferenzverfahren zur Absolutprüfung von Planflachennormalen", by J. Schwider, G. Schulz, R. Riekher and G. Minkwitz, Optica Acta, 1966, vol. 13, No. 2, 103–119.

"Ein Interferenzverfahren zur absoluten Ebenheitsprüfung längs beliebiger Zentralschnitte", by G. Schulz, Optica Acta, 1967, vol. 14, No. 4, pp. 375–388.

"Ein Interferenzverfahren zur Absolutprüfung von Planflächennormalen", by J. Schwider, Optica Acta, 1967, vol. 14, No. 4, pp. 389–400.

"Optical Flatness Standard: Reduction of Interferograms", by William Primak, SPIE, vol. 965, Optical Testing and Metrology II (1988), pp. 375–381.

"Comments on the Paper: 'Optical Flatness Standard'", by G. Schulz and J. Schwider, Optical Engineering, pp. 559–560.

"Optical Flatness Standard" by William Primak, Optical Engineering, Nov./Dec. 1984, vol. 23, No. 6, pp. 806–815.

"Absolute Flatness Testing by the Rotation Method with Optimal Measuring-Error Compensation", by G. Schultz and J. Grzanna, Applied Optics, Jul. 1992, vol. 31, No. 19, pp. 3767–3780.

"Absolute Flatness Testing by an Extended Rotation Method Using Two Angles of Rotation", by G. Schulz, Applied Optics, Mar. 1993, vol. 32, No. 7, pp. 1055–1059.

(List continued on next page.)

Primary Examiner—Samuel A. Turner
Attorney, Agent, or Firm—Charles R. Hoffman

[57] ABSTRACT

A method and apparatus for measuring an absolute profile of a flat using an interferometer system that includes an interferometer adapted to support two flats, a detection system, and a computer adapted to compute the OPD (optical path difference) between surface of the two flats, wherein a first flat [A] having a first surface and a second flat [B] having a second surface are supported in the interferometer, with the second surface facing the first surface. The interferometer system measures the OPDs between the first and second surfaces for each pixel. The first flat [A] then is rotated by a number of predetermined angles relative to its initial position and each time the OPDs are measured. The first flat [A] is rotated to its initial position or 180° therefrom. A third flat [C] having a third surface is substituted for the second flat. The OPDs between the first and third surfaces are measured. The first flat [A] is replaced by the second flat, with the second surface facing the third in an orientation mirror imaged to its original orientation. The interferometer system is operated to measure the OPDs. The computer solves first, second, and third equations to obtain the entire surface topographies of the first, second, and third surface, wherein each equation is expressed as a sum of even—even, even–odd, odd–even, and odd—odd parts so as to effectuate cancellation of terms, permitting solving of the equations for the surface topography.

8 Claims, 3 Drawing Sheets

PUBLICATIONS

"Absolute Testing of Flatness Standards at Square–Grid Points", by J. Grzanna and G. Schulz, Optics Communications, Jun. 1990, vol. 77, No. 2,3, pp. 107–112.

"Establishing an Optical Flatness Standard", by G. Schultz, J. Schwider, C. Hiller and B. Kicker, Applied Optics, Apr. 1971, vol. 10, No. 4, pp. 929–934.

"Interferometric Testing of Smooth Surfaces", by G. Schulz and J. Schwider, Progress in Optics XIII, 1976, pp. 95–167.

"Algorithm for Reconstructing the Shape of Optical Surfaces from the Results of Experimental Data", by V. B. Gubin and V. N. Sharonov, Sov. J. Opt. Technol. 57 (3), Mar. 1990, pp. 147–148.

"Absolute Calibration of an Optical Flat", by B. Fritz, Optical Engineering, Jul./Aug. 1984, vol. 23, No. 4, pp. 379–383.

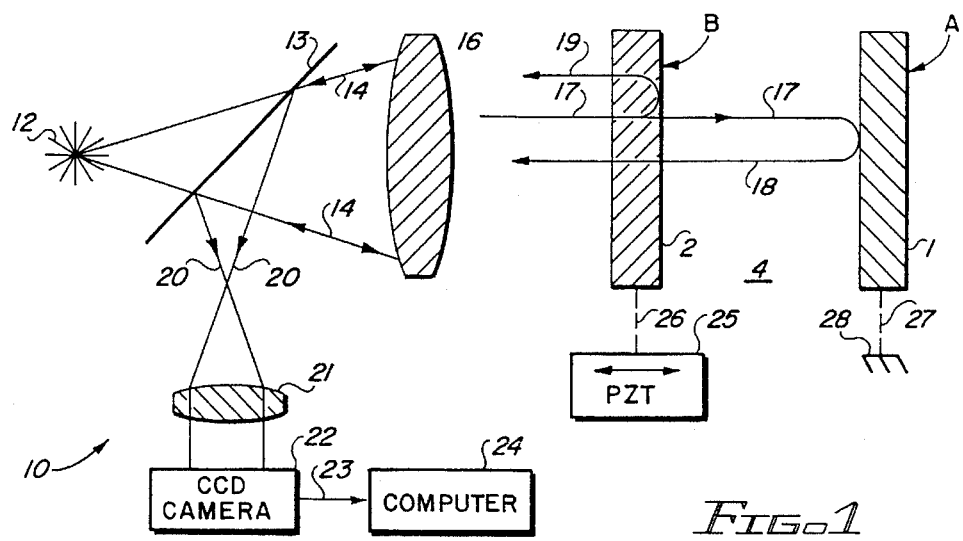
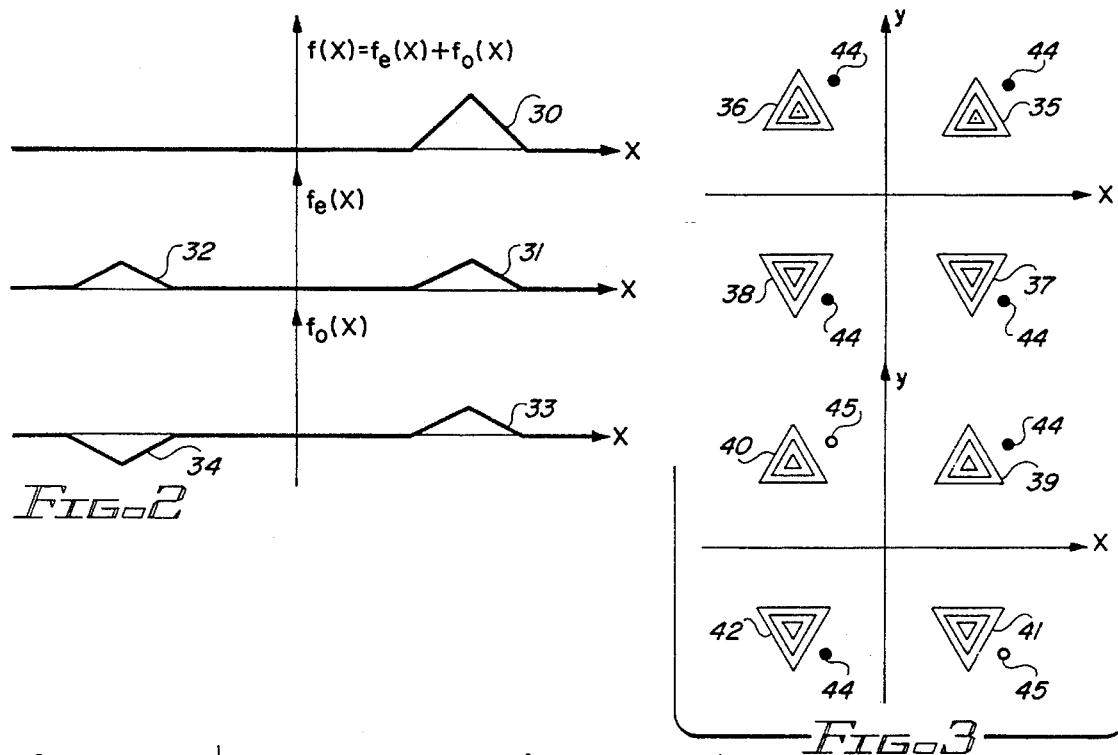
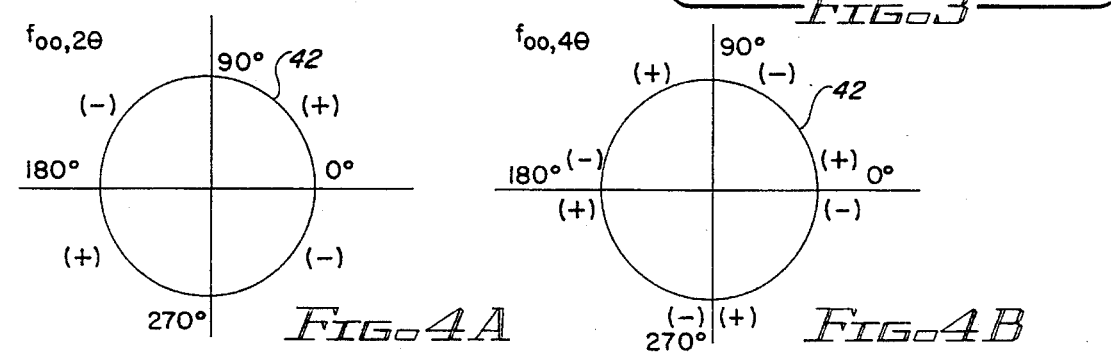

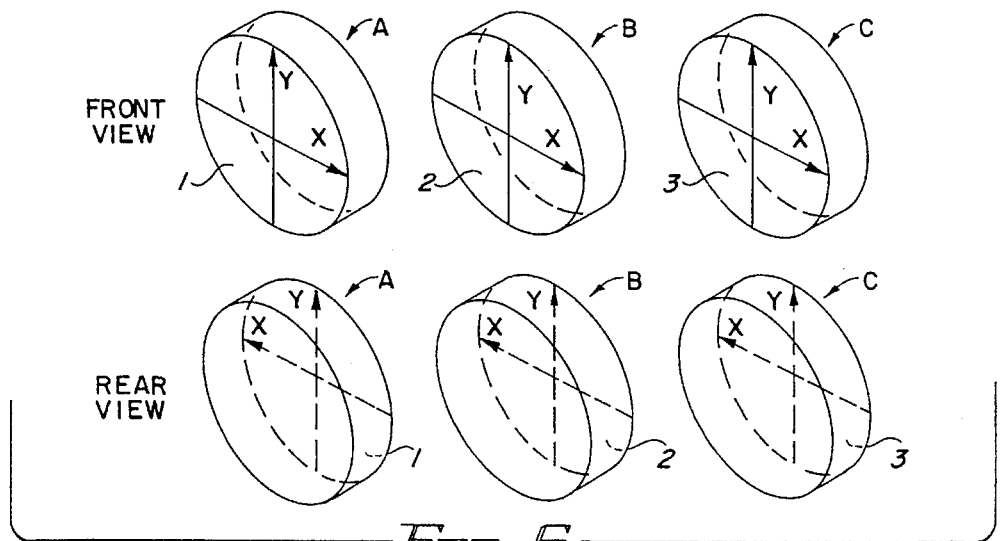
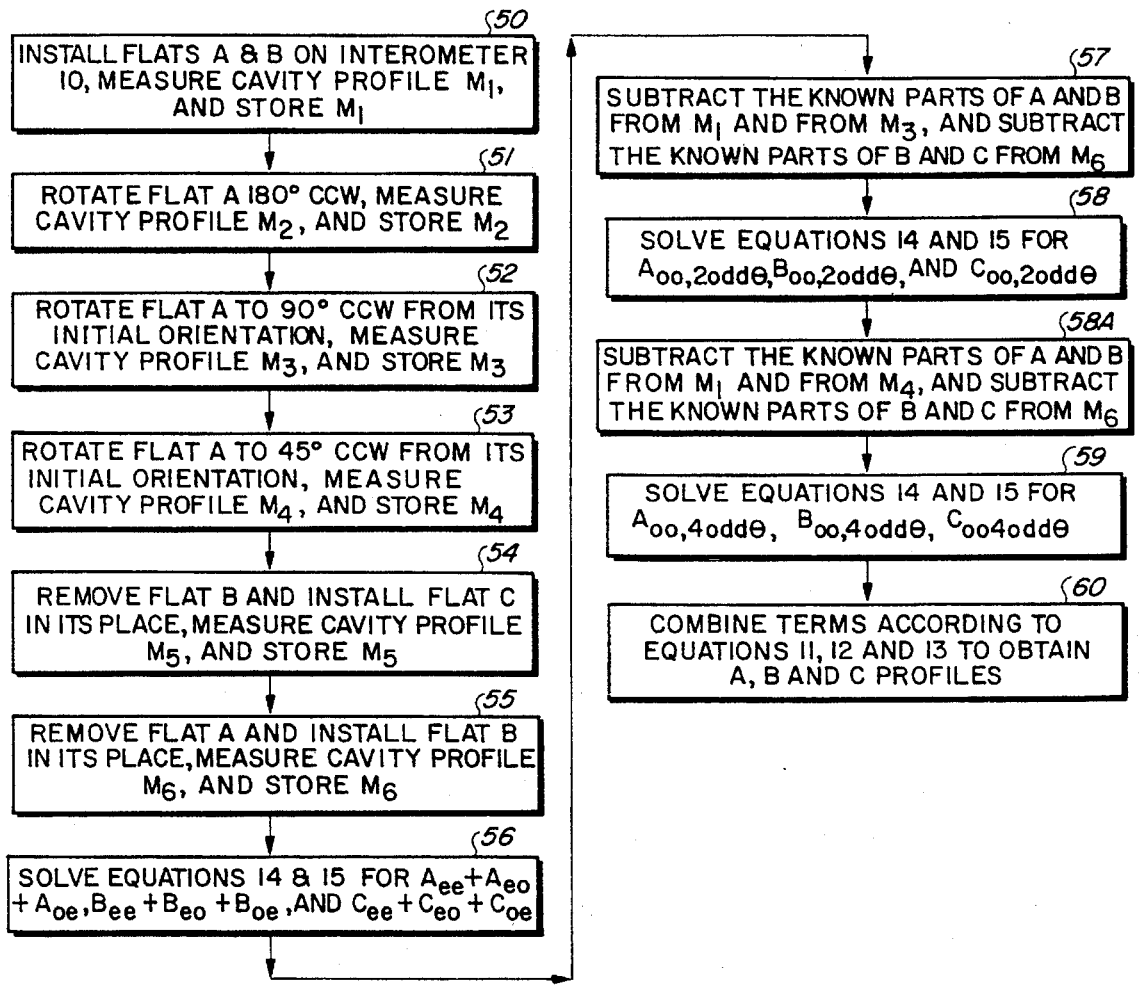

METHOD AND APPARATUS FOR ABSOLUTE OPTICAL MEASUREMENT OF ENTIRE SURFACES OF FLATS

This is a continuation of patent application Ser. No. 08/097,168, filed Jul. 23, 1993, now abandoned by Ai et al. and entitled "METHOD AND APPARATUS FOR ABSOLUTE OPTICAL MEASUREMENT OF ENTIRE SURFACES OF FLATS".

BACKGROUND OF THE INVENTION

In a Fizeau interferometer, two optical flats such as A and B, having surfaces 1 and 2, respectively, face each other and form a cavity 4, as shown in FIG. 1. The interference fringes produced by the interferometer reveal the optical path difference (OPD) between the adjacent surfaces 1 and 2 that define cavity 4. If one of the surfaces, for example, a reference surface, is perfectly flat, the optical path difference at each pixel of CCD camera 22 represents the topography of the other surface, thereby indicating the degree of flatness or non-flatness of that other surface. If the reference surface is not perfectly flat, then the accuracy of testing the flatness of the other surface is limited by the imperfection in the reference surface.

To obtain absolute measurements of flatness of a test surface, various techniques have been described, the most prominent references in this area being G. Schulz, "Ein interferenzverfahren zur absolute ebnheitsprufung langs beliebiger zntralschnitte", Opt. Acta, 14, 375–388 (1967), and G. Schulz and J Schwider, "Interferometric Testing of Smooth Surfaces", Progress in Optics XIII, E. Wolf, ed., Ch. IV (North-Holland, Amsterdam, 1976). These references describe what is referred to as the "traditional three-flat method", in which two pairs of "flats", or objects with flat surfaces are compared in pairs. For example, flats A and B are compared by obtaining interferometric measurements of the cavity between them, and flats A and C similarly are compared using interferometric measurements defining a slightly different cavity between flats A and C, and similarly for the pair of flats B and C. The flats of one of the pairs then are rotated relative to each other and similar interferometric measurements between the flats of that pair again are made. Then computations are made upon the measured data to obtain exact profiles along several diameters of each flat. Since it usually is desirable to have the topography of an entire flat surface, rather than profiles along a few diameters, the basic method described above has been improved upon to obtain profiles along a large number of diameters of each flat of each pair. Several methods, including those described in B. S. Fritz, "Absolute Calibration of an Optical Flat", Opt. Eng. 23, 379–383 (1984); J. Grzanna and G. Schulz, "Absolute Testing of Flatness Standards at Square-Grid Points", Opt. Commun. 77, 107–112 (1990); C. Ai, H. Albrecht, and J. C. Wyant, "Absolute Testing of Flats Using Shearing Technique", OSA annual meeting (Boston, 1991); J. Grzanna and G. Schulz, "Absolute Flatness Testing by the Rotation Method with Optimal Measuring Error Compensation", Appl. Opt. 31, 3767–3780 (1992); G. Schulz, "Absolute Flatness Testing by an Extended Rotation Method Using Two Angles of Rotation", Applied Optics, Vol. 32, No. 7 pp. 1055–1059 (1993), and W. Primak, "Optical Flatness Standard II: Reduction of Interferograms", SPIE Proceeding 954, 375–381 (1989), have been proposed to measure the flatness of the entire surface. The latter methods involve tremendous numbers of least squares calculations, which are very time-consuming, and more importantly, they result in loss of resolution of the profiles of the flat surfaces defining the cavities because least squares methods always tend to smooth the data.

Using the prior techniques, the above-mentioned exact profiles along individual diameters of a test flat have been attainable using four measurements of a pair of flats A and B, another pair of flats A and C, and yet another pair of flats B and C. Conventional phase-shifting interferometry using a Fizeau interferometer has been used to obtain the cavity shape, which constitutes the above-mentioned optical path difference for each pixel between adjacent faces of the two flats being compared. An example of the foregoing technique would involve four measurements $M_1$, $M_5$, $M_6$ and $M_8$, subsequently explained with reference to FIG. 5B. The most that can be achieved from the prior three-flat method for absolute testing of optical flatness is obtaining of absolute profiles of each flat surface along a large number of diameters of each flat.

Manufacturers of conventional interferometers often have proprietary software for performing the foregoing three-flat testing procedures. Although such software usually is made available to the purchasers of the interferometers, the software has no capability of performing absolute testing of entire surfaces of flats in any way that is not limited by the accuracy of the reference flat. No product presently is commercially available that allows a user of commercially available interferometers to achieve full surface absolute testing of optical flats with precision greater than that of the reference flat being used.

Users of equipment to measure absolute flatness of a test surface generally would prefer to make as few interferometric measurements as possible, because of the tedious, time-consuming nature of mounting a plurality of optical flats on the interferometer and precisely rotating them relative to each other with the needed degree of precision. This involves loosening clamps to allow removal and installation of the flats and very careful handling of the flats.

It would be highly desirable to have a fast, economical way of testing the absolute flatness of a surface with accuracy that exceeds that of the reference flat being used.

There is an unmet need for a fast, economical method and apparatus for absolute testing of an entire surface area of an optical flat.

SUMMARY OF THE INVENTION

Accordingly, it is an object of the invention to provide a technique and apparatus for absolute measurement of the topography of the entire surface of a flat.

It is another object of the invention to provide an economical technique and apparatus for measuring the topography of the entire surface of a test flat with greater accuracy than that of a reference flat being used.

It is another object of the invention to provide a technique and apparatus for absolute measurement of an the topography of optical flat with as few separate interferometric measurements as possible.

It is another object of the invention to provide a technique and apparatus for absolute measurement of an the topography of optical flat in as little time as possible, consistent with pre-established accuracy requirements.

Briefly described, and in accordance with one embodiment thereof, the invention provides a method of measuring an absolute profile of a flat using an interferometer system including an interferometer adapted to support two parallel flats, a detection system, and a computer adapted to compute the OPD between surfaces of the two flats. A first flat having a first surface and a second flat having a second surface are supported in the interferometer with the second surface facing the first surface. The interferometer system is operated to measure and store the OPDs between the first surface and the second surface for each pixel. The first flat is rotated by a predetermined angle relative to its initial position. The interferometer system again is operated to measure and store the OPDs between the first and second surfaces for each pixel. This procedure is repeated a certain number of times for the same number of other angles. The first flat is rotated to its initial position or 180° from its initial position. A third flat having a third surface is substituted for the second flat. The interferometer system is operated to measure and store the OPDs between the first and third surfaces for each pixel. The first flat is replaced by the second flat, now oriented with the second surface facing the third surface in an orientation mirror imaged with respect to its original orientation. The interferometer system is operated to measure and store the OPDs between the second and third surfaces for each pixel. The computer is operated to solve first, second, and third equations for the topographies of the first, second, and third surfaces. The first, second, and third equations each express the profiles of the corresponding first, second, and third surfaces as a sum of even—even, odd–even, even–odd, and odd—odd parts, and use the stored OPDs to compute the absolute topographies of the first, second, and third surfaces. In one described embodiment, the first flat is rotated 180°, 90°, and 45°, respectively, relative to its original position to obtain the OPD measurements referred to. The OPD measurements are designated M1,M2–M6, respectively. The first, second, and third equations are $$A = A_{ee} + A_{oe} + A_{eo} + A_{oo,2odd\theta} + A_{oo,4odd\theta},$$
$$B = B_{ee} + B_{oe} + B_{eo} + B_{oo,2odd\theta} + B_{oo,4odd\theta},$$
$$C = C_{ee} + C_{oe} + C_{eo} + C_{oo,2odd\theta} + C_{oo,4odd\theta}.$$

wherein in one of the described embodiments the various even and odd components are related by the equations $$A_{oe} + A_{eo} = (M_1 - M_2)/2,$$
$$B_{oe} + B_{eo} = [M_1 - [M_1]^{180°}]/2 - (A_{oe} + A_{eo})]^x,$$
$$C_{oe} + C_{eo} = [(M_5 - [M_5]^{180°})/2 - (A_{oe} + A_{eo})]^x,$$
$$A_{ee} = (m_1 + m_5 - m_6 + [m_1 + m_5 - m_6]^x)/4,$$
$$B_{ee} = (m_1 + [m_1]^x - 2A_{ee})/2,$$
$$C_{ee} = (m_5 + [m_5]^x - 2A_{ee})/2,$$
$$A_{oo,2odd\theta} = (m_1' - m_3')/2,$$
$$B_{oo,2odd\theta} = ([m_1']^{90°} - m_3')/2,$$
$$C_{oo,2odd\theta} = ([m_6']^{90°} - m_6')/2 + B_{oo,2odd\theta},$$
$$A_{oo,4odd\theta} = (m_1'' - m_4'')/2,$$
$$B_{oo,4odd\theta} = ([m_1'']^{45°} - m_4'')/2,$$
$$C_{oo,4odd\theta} = ([m_6'']^{45°} - m_6'')/2 + B_{oo,4odd\theta},$$

where
$$m_1 = (M_1 + [M_1]^{180°})/2,$$
$$m_5 = (M_5 + [M_5]^{180°})/2,$$
$$m_6 = (M_6 + [M_6]^{180°})/2,$$
$$m_1' = M_1 - (A_{oe} + A_{eo} + A_{ee}) - [B_{oe} + B_{eo} + B_{ee}]^x,$$
$$m_3' = M_3 - [A_{oe} + A_{eo} + A_{ee}]^{90°} - [B_{oe} + B_{eo} + B_{ee}]^x,$$
$$m'6 = M_6 - (B_{oe} + B_{eo} + B_{ee}) - [C_{oe} + C_{eo} + C_{ee}]^x,$$
$$m_1'' = M_1 - (A_{oe} + A_{eo} + A_{ee} + A_{oo,2odd\theta}) -$$

$$[B_{oe} + B_{eo} + B_{ee} + B_{oo,2odd\theta}]^x,$$

$$m_4'' = M_4 - [A_{oe} + A_{eo} + A_{ee} + A_{oo,2odd\theta}]^{45°} -$$

$$[B_{oe} + B_{eo} + B_{ee} + B_{oo,2odd\theta}]^x,$$

$$m_6'' = M_6 - (B_{oe} + B_{eo} + B_{ee} + B_{oo,2odd\theta}) -$$

$$[C_{oe} + C_{eo} + C_{ee} + C_{oo,2odd\theta}]^x.$$

Other embodiments are disclosed which achieve absolute testing of flats using eight or four or other number of measurement configurations of three pairs of flats.

BRIEF DESCRIPTION OF THE DRAWINGS

FIG. 1 is a diagram illustrating a pair of flats installed in an interferometer for the purpose of absolute testing of the entire surfaces of the flats.

FIG. 2 is a diagram useful in explaining how a one-dimensional function is composed of the sum of an odd function and an even function.

FIG. 3 is a diagram useful in explaining the symmetry properties of a two-dimensional function including an odd—odd part and an even—even part.

FIGS. 4A and 4B are diagrams useful in explaining periodicity of a polar coordinate function.

FIG. 6 shows the front and rear views of the optical flats A,B and C used in accordance with the invention and their associated x,y coordinate systems for each view.

FIG. 7 is a flow chart of the steps performed in accordance with one embodiment of the present invention.

DETAILED DESCRIPTION OF THE PREFERRED EMBODIMENTS

Figure 5A:
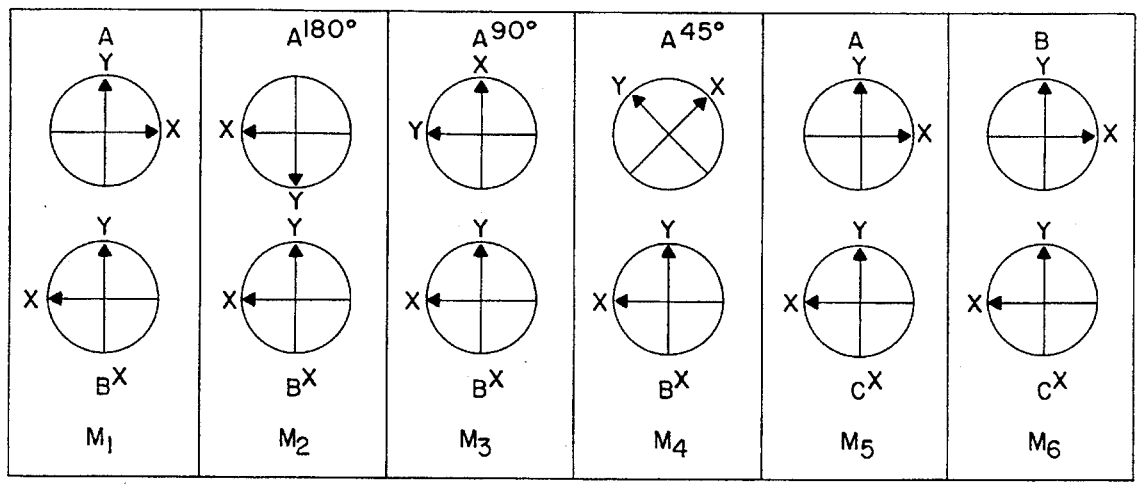
FIGS. 5A and 5B are diagrams useful in explaining various interferometric cavity measurement configurations in accordance with several embodiments of the invention.

FIG. 1 shows the configuration of an interferometer system 10 in which flat surfaces 1 and 2 of flats A and B, respectively, define the particular configuration of cavity 4 for which the OPD measurements (at each pixel) constituting the cavity shape are made, the cavity shape being the distance between flat A and B at each pixel. Interferometer system 10 can be the assignee's commercially available Wyko 6000 Fizeau phase shifting interferometer, which includes light source 12 producing beam 14 through beamsplitter 13 into lens 16. Collimated light from lens 16 passes as beam 17 through an anti-reflective coating on the rear surface of flat B, which is shown in FIG. 1 as the reference surface of cavity 4, which in the Wyko 6000 interferometer can be shifted along the optical axis by PZT (piezoelectric transducer) 25. Numeral 26 designates the physical connection of flat B to PZT 25. Some of that light is reflected by front surface 2 back through lens 16, and is reflected by beam splitter 13 as beam 20, which is focused by lens 21 onto the detector array of CCD camera 22, wherein each element of such detector array corresponds to a pixel in the field of view of the interferometer. The rest of beam 17 passes to surface 1 of flat A, which in the Wyko 6000 corresponds to the test surface supported by a physical connection 27 to a stationary support 28, and is reflected as beam 18 back through lens 16, interfering with beam 19, and being reflected by beamsplitter 13 into the CCD detector array of camera 22, which senses the resulting interference pattern. The output of CCD camera 23 is input to computer 24, which may be a DELL model 466.

Appendix 1 attached hereto is an object code printout of a program which is written in the language C to be executed on computer 24 of the Wyko 6000 interferometer for solving equations (11)–(15) to obtain the absolute profiles of flats A, B and C.

FIG. 5A shows the six cavity measurement configurations of three flats A, B, and C for which relative surface topography measurements must be made by means of interferometer system 10 of FIG. 1, the topography being the height of each pixel of the entire surface or an area thereof relative to a reference plane. The profile of the surface is the height of each pixel along a line, such as a diameter or a polar coordinate circle, relative to a reference plane. FIG. 6 shows front and rear views of flats A, B, and C and their front surfaces 1, 2, and 3, respectively. Their x,y coordinate axes are superimposed on their respective front surfaces 1, 2 and 3. The rear views in FIG. 6 all are "flipped in the x direction". The meaning of this is explained subsequently. Such relative surface topography measurements produce the OPD at each pixel of the image in cavity 4 for each of the six measurement configurations. In each configuration, the upper flat in the diagram of FIG. 5A is of a front view, and the lower flat is "flipped in the x direction" and is of a rear view of that flat. In some configurations, the upper flat is rotated 180°, 90°, or 45° with respect to the lower flat.

In FIG. 5A, M1 represents the set of optical path distance (OPD) interferometer measurements at all pixels in the interferometer "field of view" between the facing surfaces 1 and 2 of flat A and flat B, respectively, with flat B being flipped in the x direction (i.e., about the y axis). M2 represents the OPD measurements for all pixels between the facing surfaces of flat A and flat B with flat A rotated counterclockwise 180° and flat B flipped in the x direction. M3 represents the OPD measurements for all pixels between facing surfaces of flat A and flat B with flat B flipped in the x direction and flat A rotated counterclockwise 90° (from its initial angle). M4 represents the OPD measurements for every pixel with flat B flipped in the x direction and flat A rotated 45° counterclockwise. M5 represents the cavity shape between flat A in its original orientation and flat C flipped in the x direction. M6 represents the cavity shape between flat B and flat C flipped in the x direction.

In accordance with the present invention, it is recognized that a Cartesian coordinate system, a function F(x,y), which represents the surface topography of an optical flat can be expressed as the sum of an even—even part $F_{ee}(x,y)$, an odd—odd part $F_{oo}(x,y)$, an odd–even part $F_{oe}(x,y)$, and an even–odd part $F_{eo}(x,y)$ as indicated in the equation $$F(x,y) = F_{ee} + F_{oo} + F_{oe} + F_{eo} \tag{1}$$

where the subscripts indicate the symmetry of the function in the x direction and in the y direction, respectively. Because the flats such as A and B in FIG. 1 are facing each other, one flat, for example B, is "flipped" relative to the other so that the test surface and the reference surface face each other to define the cavity 4 defined by surfaces 1 and 2 of flats A and B in FIG. 1.

At this point, it may be conceptually helpful to refer to FIG. 2 for an explanation of what is meant by "even" and "odd" functions. It is known that a one-dimensional mathematical function f(x) can be expressed as the sum of an even function and a corresponding odd function, for example $$f(x) = f_e(x) + f_o(x) \tag{1A}$$

where $f_e(x) = \frac{1}{2}[f(x) + f(-x)]$, and $f_o(x) = \frac{1}{2}[f(x) - f(-x)]$.

$f_e(x)$ is an "even" function and $f_o(x)$ is an "odd" function; that is, $f_e(x)$ is an "even" function because $f_e(x) = f_e(-x)$, and $f_o(x)$ is an "odd" function because $f_o(x) = -f_o(-x)$. That is, $f_e(x)$ is an "even" function because it has left–right symmetry with respect to its values in the left and right Cartesian coordinate half planes, and similarly, $f_o(x)$ is an "odd" function because it has left–right anti-symmetry with respect to its values in the left and right half planes. Similarly, an "even" function of y has symmetry with respect to its values in the top and bottom Cartesian coordinate half planes, and an "odd" function of y has anti-symmetry with respect to its values in the top and bottom half planes.

In FIG. 2, curve 30 illustrates how the function f(x) is equal to the sum of its corresponding even component $f_e(x)$, indicated by numerals 31 and 32, and its corresponding odd function $f_o(x)$, indicated by numerals 33 and 34. The adding of $f_e(x)$ and $f_o(x)$ yields f(x) because parts 31 and 33 add to produce portion 30 of f(x) for x greater than zero, and opposite polarity portions 32 and 34 cancel for negative values of x.

From curve 31,32 in FIG. 2 it can be seen that if even function $f_e(x)$ is "flipped" along the x axis to produce $f_e(-x)$, the magnitude and polarity of the "flipped" function is unchanged. However, if odd function $f_o(x)$ is flipped about the x axis to produce $f_o(-x)$, the magnitude is unchanged, but its polarity is opposite.

The one-dimensional function of Equation 1A is similar to the function of equation (1) above, except that equation (1) is two-dimensional (in the x and y directions). For a two-dimensional Cartesian coordinate system, an example is shown in FIG. 3 to illustrate the $F_{ee}(x,y)$ and $F_{oo}(x,y)$ terms of equation (1). In FIG. 3 numerals 35,36,37,38,39 and 42 with adjacent solid dots represent triangular pyramid shapes extending upward out of the two-dimensional x,y plane of the paper toward the reader. Numerals 40 and 41 with adjacent hollow circles 45 designate identical triangular pyramids extending downward below the x,y plane of the paper away from the reader. FIG. 3 illustrates that $$F_{ee}(x,y) = F_{ee}(-x,y) = F_{ee}(x,-y) = F_{ee}(-x,-y)$$

$$F_{oo}(x,y) = -F_{oo}(-x,y) = -F_{oo}(x,-y) = F_{oo}(-x,-y). \tag{2}$$

That is, $F_{ee}(x,y)$ has a left–right symmetry and a top–bottom symmetry. $F_{oo}(x,y)$ has a left–right antisymmetry and a top–bottom antisymmetry.

Similarly, $$F_{eo}(x,y) = F_{eo}(-x,y) = -F_{eo}(x,-y) = -F_{eo}(-x,-y)$$

$$F_{oe}(x,y) = -F_{oe}(-x,y) = F_{oe}(x,-y) = -F_{oe}(-x,-y). \tag{2A}$$

Thus, a function F(x,y) in a Cartesian coordinate system can be expressed as the sum of an even–odd, an odd–even, an even—even, and an odd—odd function as follows.

$$F(x,y) = F_{ee} + F_{oo} + F_{oe} + F_{eo} \tag{2B}$$

which is identical to Equation 1.
where $$\begin{aligned}F_{ee}(x,y) &= (F(x,y) + F(-x,y) + F(x,-y) + F(-x,-y))/4, \\ F_{oo}(x,y) &= (F(x,y) - F(-x,y) - F(x,-y) + F(-x,-y))/4, \\ F_{eo}(x,y) &= (F(x,y) + F(-x,y) - F(x,-y) - F(-x,-y))/4, \\ F_{oe}(x,y) &= (F(x,y) - F(-x,y) + F(x,-y) - F(-x,-y))/4.\end{aligned} \tag{2C}$$

If two flats are defined by F(x,y) and G(x,y), respectively, and if G(x,y) is "flipped" in the x direction, then the measured optical path difference (OPD) is equal to $$F(x,y) + G(-x,y). \tag{3}$$

For convenience, an operator $[\ ]^x$, meaning "flip the flat in the x direction" and an operator $[\ ]^\theta$, meaning "rotate the flat in the θ direction", are defined "Flip in x" means:

$$[F(x,y)]^x = F(-x,y) \tag{4A}$$

"Rotate θ" means:

$$[F(x,y)]^\theta = F(x\cos\theta - y\sin\theta, x\sin\theta + y\cos\theta). \quad (4B)$$

Thus, from Equation 1, $$[F(x,y)]^{180°} = F(-x,-y). \quad (5)$$
$$[F(x,y)]^{180°} = F_{ee} + F_{oo} - F_{oe} - F_{eo}, \text{ and}$$
$$[F(x,y)]^x = F_{ee} - F_{oo} - F_{oe} + F_{eo}.$$

From Equations 5, when the flat is rotated or flipped, some of the four components change sign. This fact is used to solve for the four components of Equation 1.

Using these expressions, it is relatively easy to solve for the first three of the foregoing terms $F_{oe}(x,y)$, $F_{ee}(x,y)$, and $F_{eo}(x,y)$, as follows:
$M_1$, $M_2$, and $M_5$ from FIG. 5A can be written as $$M_1 = A_{ee} + A_{oo} + A_{oe} + A_{eo} + B_{ee} - B_{oo} - B_{oe} + B_{eo}, \quad (5A)$$
$$M_2 = A_{ee} + A_{oo} - A_{oe} - A_{eo} + B_{ee} - B_{oo} - B_{oe} + B_{eo},$$
$$M_5 = A_{ee} + A_{oo} + A_{oe} + A_{eo} + C_{ee} - C_{oo} - C_{oe} + C_{eo}.$$

Therefore, all the odd–even and the even–odd parts of the three flats can be obtained easily as $$A_{oe} + A_{eo} = (M_1 - M_2)/2, \quad (5B)$$
$$B_{oe} + B_{eo} = [(M_1 - [M_1]^{180°})/2 - (A_{oe} + A_{eo})]^x,$$
$$C_{oe} + C_{eo} = [(M_5 - [M_5]^{180°})/2 - (A_{oe} + A_{eo})]^x.$$

To cancel all the odd–even and the even–odd parts from $M_1$, $M_5$, and $M_6$, one can "rotate the data 180°" using the rotation operation defined in Equations 5. $m_1$, $m_5$, and $m_6$ are defined as $$m_1 = (M_1 + [M_1]^{180°})/2 = A_{ee} + A_{oo} + B_{ee} - B_{oo}, \quad (5C)$$
$$m_5 = (M_5 + [M_5]^{180°})/2 = A_{ee} + A_{oo} + C_{ee} - C_{oo},$$
$$m_6 = (M_1 + [M_6]^{180°})/2 = B_{ee} + B_{oo} + C_{ee} - C_{oo}.$$

It should be noted that $m_1$, $m_5$, and $m_6$ include only even—even and odd—odd functions. From Equation 5C all the even—even parts can be derived easily as given below:

$$A_{ee} = (m_1 + m_5 - m_6 + [m_1 + m_5 - m_6]^x)/4, \quad (5D)$$
$$B_{ee} = (m_1 + [m_1]^x - 2A_{ee})/2,$$
$$C_{ee} = (m_5 + [m_5]^x - 2A_{ee})/2.$$

The following discussion is directed to solving for $F_{oo}(x,y)$.

A Fourier series is used to explain the symmetry properties when a flat is rotated. In a polar coordinate system, the profile of a flat surface on a circle centered at the origin is a function of $\theta$ and has a "period" of 360°. It can be shown that for $x^2 + y^2$ = constant, the equation of a circle, $F_{oe}(x,y)$, $F_{ee}(x,y)$, $F_{eo}(x,y)$, and $F_{oo}(x,y)$ can be expressed as $\Sigma f_m \cos(m\theta)$, $\Sigma f_n \cos(n\theta)$, $\Sigma f_m \sin(m\theta)$, and $\Sigma f_n \sin(n\theta)$, respectively, where m is an odd integer and n is an even integer.

What is meant by the profile around a polar coordinate circle for the function $\sin 2\theta$ is illustrated in FIG. 4A, wherein the (+) and (−) symbols in each of the four quadrants indicate a "period" of 2 around the periphery of polar coordinate circle 42 by indicating the quadrants of polar coordinate circle 42 in which the function $\sin 2\theta$ is positive and negative. FIG. 4B illustrates the same information for the odd—odd function $\sin 4\theta$ which has a period of 4 around the periphery of polar coordinate circle 42, wherein the (+) and (−) symbols appearing in 45° increments around the periphery of polar coordinate circle 42 show the period is 4.

For an odd—odd function, the profile of a flat surface along a polar coordinate circle can be defined using only Fourier sine terms. The odd—odd function $F_{oo,2\theta}$ does not have a perfect solution, but for the purposes of the present invention it can be sufficiently accurately defined by the first few terms of the Fourier series expansion. FIGS. 4A and 4B thus are useful in understanding how a Fourier series expansion of the $F_{oo}(x,y)$ function is formed as a sum of odd—odd terms of different angular frequencies.

The Fundamental frequency of $\Sigma f_n \sin(n\theta)$ is 2, corresponding to a period of 180°, where n is an even integer. To emphasize this, a subscript $2\theta$ is added to the term $F_{oo}(x,y)$. Thus, $F_{oo}(x,y)$ can be expressed as a Fourier sine series as $$F_{oo,2\theta} = F_{oo,2odd\theta} + F_{oo,2even\theta}, \quad (6)$$

where $$F_{oo,2even\theta} = \sum_{m=even} f_{2m}\sin(2m\theta) = \sum_{m=1} f_{4m}\sin(4m\theta) = F_{oo,4\theta}, \quad (7)$$

$$F_{oo,2odd\theta} = \sum_{m=odd} f_{2m}\sin(2m\theta), \quad (8)$$

where $f_{2m}$ are coefficients of the 2mth terms of the Fourier series. Similarly, $F_{oo,4\theta}$ is divided into two groups, and defines the 4odd$\theta$ term as in Equations 6–8. Hence, $$F_{oo,2\theta} = F_{oo,2odd\theta} + F_{oo,4odd\theta} + F_{oo,8odd\theta} + \cdots \quad (9)$$

It should be noted that each term includes a very broad spectrum of the Fourier sine series. For example, $F_{oo,2odd\theta}$ includes the components of $\sin(2\theta)$, $\sin(6\theta)$, $\sin(10\theta)$, $\sin(14\theta)$, etc. For a smooth flat surface, the odd—odd part $F_{oo,2\theta}$ can be accurately represented by the first two terms of Equation 9. Using the above-described rotation operator, it can be shown that $$[F_{oo,2\theta}]^{90°} = -F_{oo,2odd\theta} + F_{oo,2even\theta}. \quad (10)$$

Comparing Equation 10 with Equation 6, one can see that the sign of $F_{oo,2odd\theta}$ is opposite, as is the sign of $F_{oo,4odd\theta}$. Thus, the 2odd$\theta$ and 4odd$\theta$ terms can be solved by rotating the flat 90° and 45°, respectively. In theory, the higher order terms can be derived by rotating the flat at a smaller angle. For example, the 8odd$\theta$ term can be determined by rotating 22.5°. Therefore, the terms of all frequencies of the odd—odd part $F_{oo,2\theta}$ of a flat can be obtained.

It should be noted, however, that no Fourier expansion is actually used for deriving the entire absolute topography of the flat in accordance with the present invention. The Fourier series are given here merely to provide insight into the limitations of this method.

The equations of the cavity shape measurements of the six measurement configurations of the pairs of flats A–B, A–C, and B–C shown in FIG. 5A are $$M_1 = A + B^X, \quad M_2 = A^{180°} + B^X, \quad (10A)$$
$$M_3 = A^{90°} + B^X, \quad M_4 = A^{45°} + B^X,$$
$$M_5 = A + C^X, \quad M_6 = B + C^X.$$

It can be shown that the odd—odd part of Equation 1 can not be solved exactly. The fact that the signs of some terms change after a rotation is used to solve for the odd–even, the even–odd, and the even—even parts of a flat first, and then the odd—odd part is solved. If the odd—odd parts of the surfaces can be approximated by 2odd$\theta$ and 4odd$\theta$ terms, the topographies of the three flats A, B and C can be approximated by the equations $$A \cong A_{ee} + A_{oe} + A_{oo,2odd\theta} + A_{oo,4odd\theta}, \quad (11)$$

$$B \cong B_{ee} + B_{oe} + B_{eo} + B_{oo,2odd\theta} + B_{oo,4odd\theta}, \quad (12)$$

$$C \cong C_{ee} + C_{oe} + C_{eo} + C_{oo,2odd\theta} + C_{oo,4odd\theta}. \quad (13)$$

The various even and odd components of Equations 11–13 are defined as given below:

$$A_{oe} + A_{eo} = (M_1 - M_2)/2, \quad (14)$$
$$B_{oe} + B_{eo} = [M_1 - [M_1]^{180°}]/2 - (A_{oe} + A_{eo})]^X,$$
$$C_{oe} + C_{eo} = [(M_5 - [M_5]^{180°})/2 - [A_{oe} + A_{eo}]^{180°}]^X,$$
$$A_{ee} = (m_1 + m_5 - m_6 + [m_1 + m_5 - m_6]^X)/4,$$
$$B_{ee} = (m_1 + [m_1]^X - 2A_{ee})/2,$$
$$C_{ee} = (m_5 + [m_5]^X - 2A_{ee})/2,$$
$$A_{oo,2odd\theta} = (m_1' - m_3')/2,$$
$$B_{oo,2odd\theta} = ([m_1']^{90°} - m_3')/2,$$
$$C_{oo,2odd\theta} = ([m_6']^{90°} - m_6')/2 + B_{oo,2odd\theta},$$
$$A_{oo,4odd\theta} = (m_1'' - m_4'')/2,$$
$$B_{oo,4odd\theta} = ([m_1'']^{45°} - m_4'')/2,$$
$$C_{oo,4odd\theta} = ([m_6'']^{45°} - m_6'')/2 + B_{oo,4odd\theta}.$$

where $$m_1 = (M_1 + [M_1]^{180°})/2, \quad (15)$$
$$m_5 = (M_5 + [M_5]^{180°})/2,$$
$$m_6 = (M_6 + [M_6]^{180°})/2,$$
$$m_1' = M_1 - (A_{oe} + A_{eo} + A_{ee}) - [B_{oe} + B_{eo} + B_{ee}]^X,$$
$$m_3' = M_3 - [A_{oe} + A_{eo} + A_{ee}]^{90°} - [B_{oe} + B_{eo} + B_{ee}]^X,$$
$$m_6' = M_6 - (B_{oe} + B_{eo} + B_{ee}) - [C_{oe} + C_{eo} + C_{ee}]^X,$$
$$m_1'' = M_1 - (A_{oe} + A_{eo} + A_{ee} + A_{oo,2odd\theta}) -$$

$$[B_{oe} + B_{eo} + B_{ee} + B_{oo,2odd\theta}]^X,$$

$$m_4'' = M_4 - [A_{oe} + A_{eo} + A_{ee} + A_{oo,2odd\theta}]^{45°} -$$

$$[B_{oe} + B_{eo} + B_{ee} + B_{oo,2odd\theta}]^X,$$

$$m_6'' = M_6 - (B_{oe} + B_{eo} + B_{ee} + B_{oo,2odd\theta}) -$$

$$[C_{oe} + C_{eo} + C_{ee} + C_{oo,2odd\theta}]^X.$$

In theory, as long as the odd—odd parts of the surfaces of flats A, B and C can be approximated by 2odd$\theta$ and 4odd$\theta$ terms, the surfaces of such flats can be determined by taking the OPD measurements for the six configurations of FIG. 5A and inserting the data from such measurements into Equations 11–15 to calculate the surface topographies of flats A, B and C.

In practice, the rotation operation [ ]$^{45°}$ in Equations 14 and 15 requires interpolation to obtain the heights of points not on the nodes of a square grid array, and such interpolation may introduce small errors. The interpolation for the height of a point is accomplished by weighting the heights of the three or four surrounding grid nodes linearly proportionally to the distances from this point to each of the nodes. See J. Grzanna and G. Schulz, "Absolute Testing of Flatness Standards at Square-Grid Points", Opt. Commun. 77, 107–112 (1990). "Decentering" of the flats which may occur as a result of the rotation operations and the flip operations also may introduce small errors. From our experiments, we find that the measurement reproducibility error is the major limiting factor of the accuracy of this method. For the three flats A, B and C there are four basic configurations. The above described embodiment of the invention uses six measurement configurations as shown in FIG. 5A, which permits use of an iteration method to reduce the measurement reproducibility error, which occurs when the flats are removed and replaced back to the mount between the various measurements.

In summary, the absolute topography of a flat can be calculated using simple arithmetic and without Fourier series, least squares, or Zernike polynomial fitting. With the six measurements of FIG. 5A, the profiles along the four diameters of the three flats in the 0°, 45°, 90°, and 135° directions are exact.

The relationship among the profiles along these diameters is also defined exactly. Because the flat A is approximated by the sum of the odd–even, even–odd, and even—even functions and the known components of the odd—odd function, the area between two adjacent diameters is missing sin (8n$\theta$) components, where n=1,2,3 . . . . These higher order terms can be derived by rotating the various flats at smaller angles.

Equations 11–13 represent the absolute entire surface topographies of the three flats or wafers A, B, and C expressed as sums of the even—even, odd–even, even–odd, and odd—odd functions described above, the first three terms being easily solved as indicated above in the references C. Ai and J. C. Wyant, "Absolute Testing of Flats Decomposed to Even and Odd Functions", SPIE Proceeding 1776, 73–83 (1992), and C. Ai and J. C. Wyant, "Absolute Testing of Flats by Using Even and Odd Functions", Appl. Opt. 32, (to appear in 1993), the odd—odd function being expressed by the first two terms of the Fourier series expansion as indicated above. Equations 14 and 15 give the values of the various terms in Equations 11–13 as a function of the interferometer-measure cavity shape measurements M1–M6 as shown in FIG. 5A.

Use of the above described technique and equations to obtain absolute measurements of the topographies of optical flats A, B, and C in accordance with Equations 11, 12, and 13 using interferometer 10 of FIG. 1 is outlined in the flow chart of FIG. 7. As indicated in block 50 of FIG. 7, flats A and B are attached by means of suitable mounts to interferometer 10 in the configuration indicated by block $M_1$ of FIG. 5A. Interferometer 10 then is operated to perform phase-shifting measurements to obtain OPDs at each pixel in the field of view of interferometer 10 for the cavity 4 defined by the present configuration of flats A and B. This set of OPDs constitutes the cavity shape $M_1$ indicated in FIG. 5A. Cavity shape $M_1$ then is stored in computer 24 of interferometer 10.

Next, in accordance with block 51 of FIG. 7, flat A is rotated 180° counterclockwise relative to its initial orientation. Interferometer 10 then is operated to generate and store the cavity shape $M_2$. In accordance with block 52, flat A then is rotated to an orientation that is 90° counterclockwise from its initial orientation. Interferometer 10 then is operated to compute and store the cavity shape $M_3$ corresponding to the configuration shown in the $M_3$ block of FIG. 5A. In accordance with block 53, flat A is rotated to an orientation 45° counterclockwise from its original orientation. Interferometer 10 then is operated to generate and store the cavity shape $M_4$ indicated in FIG. 5A.

In accordance with block 54, flat B is removed, and flat C is mounted in its place on interferometer 10 in the configuration indicated in the $M_5$ block of FIG. 5A, that is, flipped in the x direction. Interferometer 10 then is operated to compute and store the cavity shape $M_5$.

Finally, in accordance with block 55 of FIG. 7, flat A is removed from interferometer 10 and replaced by flat B, oriented as indicated in the $M_6$ block of FIG. 5A. Interferometer 10 then computes and stores the cavity shape $M_6$.

Then, as indicated in block 56, appropriate ones of Equations 14 and 15 are solved using the program of Appendix 1 to obtain values of the even—even, even–odd, and odd–even terms of Equations 11, 12, and 13.

Next, in accordance with block 57 of FIG. 7, the various terms obtained according to block 56 are subtracted from $M_1$, and $M_3$, and $M_6$ to obtain $m_1'$, $m_3'$, and $m_6'$ of Equations 15.

Next, according to block 58, the various terms in Equations 14 and 15 are solved using the program of Appendix 1 to obtain values for the terms $A_{oo,2odd\theta}$, $B_{oo,2odd\theta}$, and $C_{oo,2odd\theta}$. Finally, other expressions of Equations 14 and 15 are solved to obtain values of $A_{oo,4odd\theta}$, $B_{oo,4odd\theta}$, and $C_{oo,4odd\theta}$.

Next, in accordance with block 58A of FIG. 7, the various terms obtained according to blocks 56 and 58 are subtracted from $M_1$, $M_4$, and $M_6$ to obtain $m_1''$, $m_4''$, and $m_6''$ of Equations 15.

The terms obtained in block 56, 58, and 59 of FIG. 7 then are combined in accordance with Equations 11, 12, and 13 to obtain the absolute topographies of the entire surfaces of flats A, B, and C.

The above technique was derived by recognizing that some of the even—even, even–odd, etc. terms include functions that undergo polarity changes when rotated by a particular number of degrees so as to result in additional equations and so as to result in cancellation of various terms when the equations are solved mathematically. By experimentation and intuition, it was found that such cancellations occur in such a way as to greatly reduce the number of measurements needed.

Figure 5B:
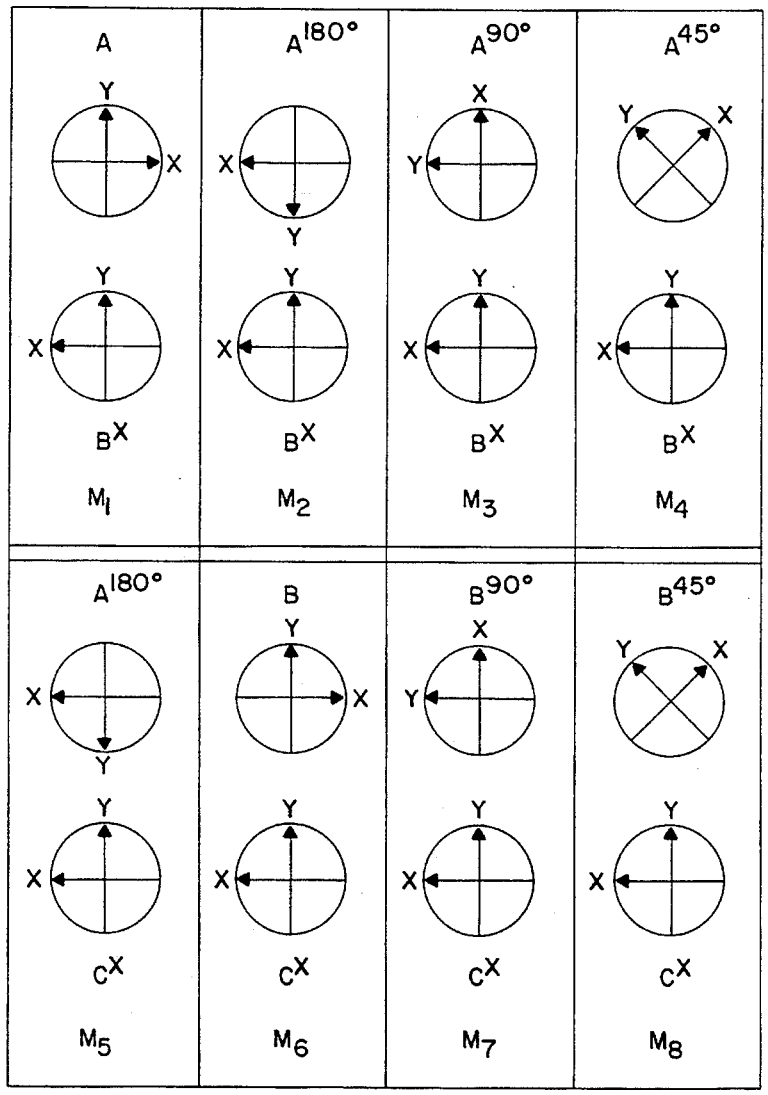

FIG. 5B shows eight measurement configurations of flats A, B, and C, rather than six as in FIG. 5A. The methodology according to FIG. 5B is similar to the methodology corresponding to FIG. 5A, but the equations are different, and are given below.

In each configuration in FIG. 5B, the flat is of a front view, and the lower one is flipped in x and is of a rear view. In various configurations shown in FIG. 5B, one flat is rotated 180°, 90°, or 45° with respect to another flat. The equations of the eight configurations are $$M_1 = A + B^x, \quad M_2 = A^{180°} + B^x, \quad (16)$$
$$M_3 = A^{90°} + B^x, \quad M_4 = A^{45°} + B^x,$$
$$M_5 = A^{180°} + C^x, \quad M_6 = B + C^x,$$
$$M_7 = B^{90°} + C^x, \quad M_8 = B^{45°} + C^x.$$

Using Equations 2B and 2C, $M_1$, $M_2$, and $M_5$ can be written as $$M_1 = A_{ee} + A_{oo} + A_{oe} + A_{eo} + B_{ee} - B_{oo} - B_{oe} + B_{eo}, \quad (17)$$
$$M_2 = A_{ee} + A_{oo} - A_{oe} - A_{eo} + B_{ee} - B_{oo} - B_{oe} + B_{eo},$$
$$M_5 = A_{ee} + A_{oo} - A_{oe} - A_{eo} + C_{ee} - C_{oo} - C_{oe} + C_{eo},$$

which are similar to Equations 5A.

Therefore, all of the odd–even and the even–odd parts of the three flats can be obtained easily according to $$A_{oe} + A_{eo} = (M_1 - M_2)/2, \quad (18)$$
$$B_{oe} + B_{eo} = [(M_1 - [M_1]^{180°})/2 - (A_{oe} + A_{eo})]^x,$$
$$C_{oe} + C_{eo} = [(M_5 - [M_5]^{180°})/2 - [A_{oe} + A_{eo}]^{180°}]^x,$$

which are similar to Equations 5B.

To cancel all of the odd–even and the even–odd parts from $M_1$, $M_5$, and $M_6$, one can "rotate the data by 180°" using the rotation operation defined in Equations 5. $m_1$, $m_5$, and $m_6$ are defined as $$m_1 = (M_1 + [M_1]^{180°})/2 = A_{ee} + A_{oo} + B_{ee} - B_{oo}, \quad (19)$$
$$m_5 = (M_5 + [M_5]^{180°})/2 = A_{ee} + A_{oo} + C_{ee} - C_{oo},$$
$$m_6 = (M_6 + [M_6]^{180°})/2 = B_{ee} + B_{oo} + C_{ee} - C_{oo},$$

which are identical to Equations 5C.

It should be noted that $m_1$, $m_5$, and $m_6$ include only even—even and odd—odd functions. All of the even—even parts can also be obtained easily as $$A_{ee} = (m_1 + m_5 - m_6 + [m_1 + m_5 - m_6]^x)/4, \quad (20)$$
$$B_{ee} = (m_1 + [m_1]^x - 2A_{ee})/2,$$
$$C_{ee} = (m_5 + [m_5]^x - 2A_{ee})/2,$$

which are identical to Equations 5D.

Because all of the even—even, even–odd, and odd–even parts of each flat are obtained, they can be subtracted from $M_1$, $M_5$, $M_6$, and $M_7$, respectively. The difference includes only the odd—odd part $A_{oo,2\theta}$, $B_{oo,2\theta}$ and $C_{oo,2\theta}$. $m'_1$, $m'_3$, $m'_6$, and $m'_7$ are defined as $$m'_1 = A_{oo,2\theta} - B_{oo,2\theta}. \quad (21)$$

-continued $$m'_3 = [A_{oo,2\theta}]^{90°} - B_{oo,2\theta}.$$
$$m'_6 = B_{oo,2\theta} - C_{oo,2\theta}.$$
$$m'_{17} = [B_{oo,2\theta}]^{90°} - C_{oo,2\theta}.$$

All of the 2odd$\theta$ parts of the three flats are obtained as $$A_{oo,2odd\theta} = (m'_1 - m'_3)/2, \quad (22)$$
$$B_{oo,2odd\theta} = (m'_6 - m'_7)/2,$$
$$C_{oo,2odd\theta} = ([m'_7]^{-90°} - m'_6)/2,$$

The 2even$\theta$ term of Equation 6 can be divided into two halves, namely the 4even$\theta$ and 4odd$\theta$ terms. The 4odd$\theta$ term can be obtained by rotating one flat 45° instead of 90°. Using a similar procedure for deriving Equations 21 and 22, $m''_1$, $m''_4$, $m''_6$ and $m''_8$ are defined as $$m''_1 = A_{oo,4\theta} - B_{oo4\theta}, \quad (23)$$
$$m''_4 = [A_{oo,4\theta}]^{45°} - B_{oo4\theta},$$
$$m''_6 = B_{oo,4\theta} - C_{oo4\theta},$$
$$m''_8 = [B_{oo,4\theta}]^{45°} - C_{oo4\theta}.$$

Then, all of the 4odd$\theta$ terms can be obtained as $$A_{oo,4odd\theta} = (m''_1 - m''_4)/2, \quad (24)$$
$$B_{oo,4odd\theta} = (m''_6 - m''_8)/2,$$
$$C_{oo,4odd\theta} = ([m''_8]^{-45°} - m''_6)/2.$$

In summary, the sum of one half of the Fourier sine series (i.e., 2odd$\theta$ term) is obtained from the 90° rotation group. The other half is further divided into two halves, and one of them (i.e., 4odd$\theta$ term) is obtained from the 45° rotation group. Thus, after each rotation, one half of the unknown components of the Fourier sine series of the odd—odd function is obtained. The higher order terms can be derived by rotating the flat at a smaller angle. For example, the 8odd$\theta$ term is determined by rotating 22.5°. If the odd—odd component of the flat can be approximated by the first terms as are those in Equation 9, the three flats can be approximated by Equations 11–13.

It has been recognized that the flat topographies can be calculated using either four or six of the measurement configurations of FIG. 5A because $M_3$ and $M_2$ can be expressed in terms of $M_4$ and $M_1$. See L -Z Shao, R. E. Parks and C. Ai, "Absolute Testing of Flats Using Four Data Sets", SPIE Proceeding 1776, 94–97 (1992).

Using the operators of Equations 4A and 4B, it can be shown easily that $M_3$ and $M_2$ can be expressed in terms of $M_4$ and $M_1$, that is, $$M_3 = A^{90°} + B^x \quad (25)$$
$$= [A^{45°} + B^x]^{45°} - [A + B^x]^{45°} + [A^{45°} + B^x]$$
$$= [M_4 - M_1]^{45°} + M_4,$$

and $$M_2 = A^{180°} + B^x \quad (26)$$
$$= [A^{90°} + B^x]^{90°} - [A + B^x]^{90°} + [A^{90°} + B^x]$$
$$= [M_3 - M_1]^{90°} + M_3.$$

Therefore, both $M_2$ and $M_3$ in all the Equations 14 and 15 can be substituted with Equations 25 and 26. Then only four measurements $M_1$, $M_4$, $M_5$, and $M_6$ of the six-measurement procedure are needed.

It is shown above that $A_{oo,2odd\theta}$, $B_{oo,2odd\theta}$, and $C_{oo,2odd\theta}$ are derived from two nonrotational measurements $M_1$ and $M_6$ and a 90° measurement $M_3$, and $A_{oo,4odd\theta}$, $B_{oo,4odd\theta}$, and $C_{oo,4odd\theta}$ are derived from two nonrotational measurements $M_1$ and $M_6$ and a 45° measurement $M_4$. Similarly, it can be shown easily that $A_{oo,8odd\theta}$, $B_{oo,8odd\theta}$, and $C_{oo,8odd\theta}$ can be derived by two nonrotational measurements $M_1$ and $M_6$ and a 22.5° measurement. Here $M_7$ is defined as a 22.5° measurement which is similar to $M_4$, except that flat A is rotated 22.5°, rather than 45°, i.e., $$M_7 = A^{22.5°} + B^x. \quad (27)$$

Using the same procedure for deriving $A_{oo,4odd\theta}$, $B_{oo,4odd\theta}$, and $C_{oo,4odd\theta}$ of Equations 14, one can obtain $$A_{oo,8odd\theta} = (m_1^r - m_7^r)/2, \quad (28)$$
$$B_{oo,8odd\theta} = \{[m_1^r]^{22.5°} - m_7^r\}/2,$$
$$C_{oo,8odd\theta} = \{[m_6^r]^{22.5°} - m_6^r + [m_1^r]^{22.5°} - m_7^r\}/2,$$

where $m_1^r$, $m_6^r$, and $m_7^r$ are the differences after subtracting the known parts of flat A and flat B from $M_1$, $M_6$, and $M_7$, respectively, i.e., $$m_1^r = M_1 - A' - [B']^x, \quad (29)$$
$$m_6^r = M_6 - B' - [C']^x,$$
$$m_7^r = M_7 - [A']^{22.5°} - [B']^x,$$

where A', B', and C' are defined as below:

$$A' = A_{oe} + A_{eo} + A_{ee} + A_{oo,2odd\theta} + A_{oo,4odd\theta}, \quad (30)$$
$$B' = B_{oe} + B_{eo} + B_{ee} + B_{oo,2odd\theta} + B_{oo,4odd\theta},$$
$$C' = C_{oe} + C_{eo} + C_{ee} + C_{oo,2odd\theta} + C_{oo,4odd\theta}.$$

All of the components of the 2odd$\theta$, 4odd$\theta$, and 8odd$\theta$ terms are obtained by rotating the flat 90° ($M_3$), 45° ($M_4$), and 22.5° ($M_7$), respectively. Similarly to Equations 27–30, the components of the 16odd$\theta$, 32odd$\theta$, and higher order terms with a smaller rotation angle, can be derived.

In the derivation of Equations 25 and 26, the 180° measurement $M_2$ is expressed in terms of the 90° measurement $M_3$, which is also expressed in terms of a 45° measurement $M_4$. Using the same procedure, the 45° measurement $M_4$ can be expressed in terms of the 22.5° measurement $M_7$. Therefore, $$M_4 = [M_7 - M_1]^{22.5°} + M_7. \quad (31)$$

From Equations 25, 26, and 31, $M_2$, $M_3$, and $M_4$ can be expressed in terms of $M_1$ and $M_7$. Hence, only four measurements $M_1$, $M_5$, $M_6$, and $M_7$ are needed.

The four parts can be derived in different sequence and different combinations. Because only four measurements are needed, we redefine the equations of the four configurations and express the equations for all components explicitly in terms of these four measurements. Here, we use $N_1$ to represent the measurements in order to distinguish them from the measurements $M_1$. The four measurements $N_1$, $N_2$, $N_3$, and $N_4$ correspond to $M_1$, $M_5$, $M_6$, and $M_4$, respectively, as follows:

$$N_1 = A + B^x, \quad N_2 = A + C^x, \quad (32)$$
$$N_3 = B + C^x, \quad N_4 = A^{45°} + B^x.$$

Using the previous procedures, we derive the components of even—even and even–odd first:

$$A_{ee} + A_{eo} = \{[N_1]^x + N_2 - N_3\}/2, \quad (33)$$
$$B_{ee} + B_{eo} = (N_1 - N_2 + N_3)/2,$$
$$C_{ee} + C_{eo} = \{-N_1 + N_2 + [N_3]^x\}/2.$$

The even—even components are easily solved for, as previously described for the six-measurement and eight-measurement embodiments of the invention.

Next, we derive the odd–even components of each flat. To make the error analysis easy, we manipulate the expressions such that the right-hand side of the equation always has the same number of measurements for each flat. Therefore $$A_{oe} = (N_1 - N_6)/2 + \{[[N_1]^x + N_2 - N_3]^{180°}\}/4 - \quad (34)$$
$$\{[N_1]^x + N_2 - N_3\}/4,$$

$$B_{oe} = (N_1 - N_6)/2 + \{[N_1 + N_2 - N_3]^{180°}\}/4 -$$
$$(N_1 + N_2 - N_3)/4,$$

$$C_{oe} = (N_1 - N_6)/2 + \{[N_1 + N_2 - [N_3]^x]^{180°}\}/4 -$$
$$\{N_1 + N_2 - [N_3]^x\}/4,$$

where $$N_5 = [N_4 - N_1]^{45°} + N_4,$$
$$N_6 = [N_5 - N_1]^{90°} + N_5. \quad (35)$$

Similarly, the 2odd$\theta$ and 4odd$\theta$ terms are given below:

$$A_{oo,2odd\theta} = (N_1 - N_5)/2 + \{[[N_1]^x + N_2 - N_3]^{90°}\}/4 - \quad (36)$$
$$\{[N_1^x + N_2 - N_3]\}/4 + \{[A_{oe}]^{90°} - A_{oe}\}/2,$$

$$B_{oo,2odd\theta} = (N_1 - N_5)/2 + \{[N_1 + N_2 - N_3]^{90°}\}/4 -$$
$$(N_1 + N_2 - N_3)/4 + \{[B_{oe}]^{90°} - B_{oe}\}/2,$$

$$C_{oo,2odd\theta} = (N_1 - N_5)/2 + \{[N_1 + N_2 - [N_3]^x]^{90°}\}/4 -$$
$$\{N1 + N_2 - [N_3]^x\}/4 + \{[C_{oe}]^{90°} - C_{oe}\}/2,$$

and
$$A_{oo,4odd\theta} = (N_1 - N_4)/2 + \{[[N_1]^x + N_2 - N_3]^{45°}\}/4 - \quad (37)$$
$$\{[N1]^x + N_2 - N_3\}/4 + \{[A_{oe}]^{45°} - A_{oe}\}/2 +$$
$$\{[A_{oo,2odd\theta}]^{45°} - A_{oo,2odd\theta}\}/2,$$

$$B_{oo,4odd\theta} = (N_1 - N_4)/2 + \{[N_1 + N_2 - N_3]^{45°}\}/4 -$$
$$(N_1 + N_2 - N_3)/4 + \{[B_{oe}]^{45°} - B_{oe}\}/2 +$$
$$\{[B_{oo,2odd\theta}]^{45°} - B_{oo,2odd\theta}\}/2,$$

$$C_{oo,4odd\theta} = (N_1 - N_4)/2 + \{[N_1 + N_2 - [N_3]^x]^{45°}\}/4 -$$
$$\{N_1 + N_2 - [N_3]^x\}/4 + \{[C_{oe}]^{45°} - C_{oe}\}/2 +$$
$$\{[C_{oo,2odd\theta}]^{45°} - C_{oo,2odd\theta}\}/2.$$

In summary, if the odd—odd parts of the surfaces can be approximated by 2odd$\theta$ and 4odd$\theta$ terms, the flats can be derived with this four-measurement algorithm. Each flat can be calculated from the sum of the corresponding terms in Equations 33, 34, 36, and 37.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

APPENDIX 1

```
modify.exe
USAGE: modify INFILE OUTFILE [-x XCENTER] [-y YCENTER]
       [-a XSHIFT] [-o YSHIFT] [-z SCALE [XCEN YCEN]]
       [-r ANGLE [XCEN YCEN]] [-i]
WHERE:
       INPFILE contains data array to be modified
       OUTFILE contains data array after modified
       -x flips the data in the X direction at XCENTER
       -y flips the data in the Y direction at YCENTER
       -a shifts the data in the X direction by XSHIFT pixels
       -o shifts the data in the Y direction by YSHIFT pixels
       -z zooms the data by SCALE at center (XCEN, YCEN)
       -r rotates the data by ANGLE at center (XCEN, YCEN)
       -i inverts the whole data array (times by -1)

subtract.exe
USAGE: subtract infile1 infile2 outfile [-# ENVFILE] [-r]
            [-b BLOCKNAME] [-a]
WHERE:
       infile1 is the minuend
       infile2 is the subtrahend
       outfile is the difference (infile1 - infile2)
       -# specifies the environment file ENVFILE
       -r specifies this is a reference file
       -b specifies the name of the block (same in both files) to use
       -a specifies to add instead of subtracting rescale.exe
USAGE: rescale INFILE OUTFILE [-s SCALE]
WHERE:
       -s rescales the data by SCALE
```

APPENDIX 1

*rescale*

```
flt_phase = (float**) phase_header->data_ptr;    /* Pointers to the data */ for( i = 0; i < phase_header->header.x_size; i++ )
   for( j = 0; j < phase_header->header.y_size; j++ )
      if( flt_phase[i][j] != BAD_PIXEL_FLOAT )
         flt_phase[i][j] *= scale;
```

APPENDIX 1

```c
static void sub_float(void) {
register x, y;
float wavelen_scale1 = (float) 1, wavelen_scale2 = (float) 1,
      ref_wavelength = (float) 1;
float **data1, **data2, *l1, *l2;

if ((ref_wavelength != (float) 1) || (add_data)) {
     if (add_data)
       wavelen_scale2 = - wavelen_scale2;
     for (x=0; x<infile1_header->header.x_size; x++) {

ASSIGN_LINES(float)
       if (escape_out(0))
         close_del_exit(NO_FNUM, NO_FNAME, NO_MSG, TRUE, -27);
       else {
         for(y=0; y<infile1_header->header.y_size; y++, l2++, l1++) {
           if ((*l2 != BAD_PIXEL_FLOAT) &&
               (*l1 != BAD_PIXEL_FLOAT))
             *l1 = (*l1 * wavelen_scale1) - (*l2 * wavelen_scale2);
           else
             *l1 = BAD_PIXEL_FLOAT;
         }
       }
     }
   }
/**** Subtract ****/
   else {
     for (x=0; x<infile1_header->header.x_size; x++) {
       if (escape_out(0))
         close_del_exit(NO_FNUM, NO_FNAME, NO_MSG, TRUE, -30);
       else { l1 = data1[x];
         if (read_single_line) {
           if (single_line != NULL)
             free(single_line);
           single_line = get_3d_col(file2_handle,infile2_data_blk_name,
                                  &(infile2_header->header),x);
           if (single_line == NULL) {
             sprintf(msg, "%s%s%s%s", GET_ERR, infile2_data_blk_name,
                 IN_FILE, infile2_name);
             close_del_exit(-1, NO_FNAME, msg, TRUE, -11);
           }
           l2 = (float *) single_line;
         }
         else
           l2 = data2[x];

for (y=0; y<infile1_header->header.y_size; y++, l1++, l2++)
           if (*l2 == BAD_PIXEL_FLOAT)
             *l1 = BAD_PIXEL_FLOAT;
           else
             if (*l1 != BAD_PIXEL_FLOAT)
               *l1 -= *l2;
       }
     }
   }
}
```

APPENDIX 1

```
#define EPSILON        (float) 0.00001
static float cur_height_f    t(float x1, float y1)
{
  int x, y;
  float p, q, p1, q1;

x = (int) x1;
  y = (int) y1;
  p = (float) (y1 - (float) y);
  p1 = 1 - p;
  q = (float) (x1 - (float) x);
  q1 = 1 - q;

if ( (x >= 0) && (x < hdr->header.x_size-1) &&
    (y >= 0) && (y < hdr->header.y_size-1) ) {
    if ((p <= EPSILON) && (q <= EPSILON))
      return ( cur_fphase[x][y] );
    else
    if ( (cur_fphase[x  ][y  ] < BAD_PIXEL_FLOAT) &&
         (cur_fphase[x  ][y+1] < BAD_PIXEL_FLOAT) &&
         (cur_fphase[x+1][y  ] < BAD_PIXEL_FLOAT) &&
         (cur_fphase[x+1][y+1] < BAD_PIXEL_FLOAT) )
      return ( p1 * q1 * cur_fphase[x][y]   + p * q1 * cur_fphase[x][y+1] +
               p1 * q  * cur_fphase[x+1][y] + p * q  * cur_fphase[x+1][y+1] );
    else
      return (BAD_PIXEL_FLOAT);
  }
  else
    return (BAD_PIXEL_FLOAT);
}       /* cur_height_float */ static void flip_x_float(int axis)
{
  int x, y, x_start, x_end, x_flip;

action_msg("Flipping data in X...");
  if ( axis < (x_size/2) )
  {
    x_start = 0;
    x_end = axis * 2 + 1;
  }
  else /* flip axis is in the right part */
  {
    x_start = axis - (x_size - 1 - axis);
    x_end = x_size;
  }
  zero_array_float();
  if (one_array) {  /* clear the lines not used */
    for (x = 0; x < x_start; x++)
      copy_line_float( fdata_line, x );
    for (x = x_end; x < x_size; x++)
      copy_line_float( fdata_line, x );
  }
  for (x=x_start; x<x_end; x++)
  {
    x_flip = x_end - 1 - (x - x_start);
    for (y=0; y<y_size; y++)
      fdata_line[y] = cur_fphase[x_flip][y];
    copy_line_float( fdata_line, x );
  }
  screen_msg("Flipping data in X");
} /* flip_x_float */
```

APPENDIX 1

```
static void flip_y_float(int axis)
{
  int x, y, y_start, y_end, y_flip;

if ( escape_out(FALSE) )
  {
    start_over = FALSE;
    return;
  }
  action_msg("Flipping data in Y...");
  if ( axis < (y_size/2) )
  {
    y_start = 0;
    y_end = axis * 2 + 1;
  }
  else /* flip axis is in the upper part */
  {
    y_start = axis - (y_size - 1 - axis);
    y_end = y_size;
  } zero_array_float();
  if (one_array) {
    y_flip = (y_end - 1 + y_start);

for (x=0; x<x_size; x++) {
      for (y=y_start; y<y_end; y++)
        fdata_line[y] = cur_fphase[x][y_flip - y];
      copy_line_float( fdata_line, x );
    }
  }
  else {
    for (y=y_start; y<y_end; y++)
    {
      y_flip = y_end - 1 - (y - y_start);
      for (x=0; x<x_size; x++)
        fphase[x][y] = cur_fphase[x][y_flip];
    }
  }
  screen_msg("Flipping data in Y");
} /* flip_y_float */
```

APPENDIX 1

```
static void rotate_data_float(float theta, float xavg, float yavg)
{
  int x, y;
  float cos_theta, x_sin_theta, y_sin_theta,
        x1, y1, i_x_term, i_y_term;

action_msg("Rotating data...");
  theta = -theta * M_PI / 180;  /* convert degrees to radians & change sign */
  cos_theta = (float) cos(theta);
  x_sin_theta = (float) sin(theta);
  y_sin_theta = x_sin_theta * aspect;
  x_sin_theta = x_sin_theta / aspect;

for (x=0; x<x_size; x++)
  {
    i_x_term = (float) (xavg + (x-xavg) * cos_theta);
    i_y_term = (float) (yavg + (x-xavg) * x_sin_theta);
    for (y=0; y<y_size; y++)
    {
      x1 = i_x_term - (y-yavg) * y_sin_theta;
      y1 = i_y_term + (y-yavg) * cos_theta;
//       fphase[x][y] = cur_height_float(x1, y1);
      fdata_line[y] = cur_height_float(x1, y1);
    }
    copy_line_float( fdata_line, x );
  }
  screen_msg("Rotating data");
} /* rotate_data_float */
```

APPENDIX 1

```
       echo off rem ****** USE 6 MEASUREMENT ALGORITH
rem ****** I/P: (%1 %2 %3: dummy),
rem ******      (%4 %5: flip and rotation centers) ****
rem ****** NOTE: M1-M6 MUST exist.
rem ****** All equation numbers are referred to my paper
rem ******      in Appl. Opt. V32, 1993.

rem ****************************************** FIND OEEO, Eq. (15)
subtract -$ M1.OPD M2.OPD Aoeeo.OPD
if ERRORLEVEL 1 goto end
rescale -$ Aoeeo.OPD Aoeeo.OPD -s 0.5
if ERRORLEVEL 1 goto end modify -$ M1.OPD TEMP.OPD -r 90 %4 %5
if ERRORLEVEL 1 goto end
modify -$ TEMP.OPD TEMP.OPD -r 90 %4 %5
if ERRORLEVEL 1 goto end
subtract -$ M1.OPD TEMP.OPD Boeeo.OPD
if ERRORLEVEL 1 goto end
rescale -$ Boeeo.OPD Boeeo.OPD -s 0.5
if ERRORLEVEL 1 goto end
subtract -$ Boeeo.OPD Aoeeo.OPD Boeeo.OPD
if ERRORLEVEL 1 goto end
modify -$ Boeeo.OPD Boeeo.OPD -x %4
if ERRORLEVEL 1 goto end modify -$ M5.OPD TEMP.OPD -r 90 %4 %5
if ERRORLEVEL 1 goto end
modify -$ TEMP.OPD TEMP.OPD -r 90 %4 %5
if ERRORLEVEL 1 goto end
subtract -$ M5.OPD TEMP.OPD Coeeo.OPD
if ERRORLEVEL 1 goto end
rescale -$ Coeeo.OPD Coeeo.OPD -s 0.5
if ERRORLEVEL 1 goto end
subtract -$ Coeeo.OPD Aoeeo.OPD Coeeo.OPD
if ERRORLEVEL 1 goto end
modify -$ Coeeo.OPD Coeeo.OPD -x %4
if ERRORLEVEL 1 goto end rem **************************************** Eq. (16) ********
modify -$ M1.OPD TEMP.OPD -r 90 %4 %5
if ERRORLEVEL 1 goto end
modify -$ TEMP.OPD TEMP.OPD -r 90 %4 %5
if ERRORLEVEL 1 goto end
subtract -$ M1.OPD TEMP.OPD SUM1.OPD -a
if ERRORLEVEL 1 goto end
rescale -$ SUM1.OPD SUM1.OPD -s 0.5
if ERRORLEVEL 1 goto end modify -$ M5.OPD TEMP.OPD -r 90 %4 %5
if ERRORLEVEL 1 goto end
modify -$ TEMP.OPD TEMP.OPD -r 90 %4 %5
if ERRORLEVEL 1 goto end
subtract -$ M5.OPD TEMP.OPD SUM2.OPD -a
if ERRORLEVEL 1 goto end
rescale -$ SUM2.OPD SUM2.OPD -s 0.5
if ERRORLEVEL 1 goto end
```

APPENDIX 1

```
modify -$ M6.OPD TEMP.OPD -r 90 %4 %5
if ERRORLEVEL 1 goto end
modify -$ TEMP.OPD TEMP.OPD -r 90 %4 %5
if ERRORLEVEL 1 goto end
subtract -$ M6.OPD TEMP.OPD SUM3.OPD -a
if ERRORLEVEL 1 goto end
rescale -$ SUM3.OPD SUM3.OPD -s 0.5
if ERRORLEVEL 1 goto end copy TEMP.OPD AEE.OPD
copy TEMP.OPD BEE.OPD
copy TEMP.OPD CEE.OPD
rem ****************************************** FIND EE, Eq. (17)
subtract -$ SUM1.OPD SUM2.OPD TEMP1.OPD -a
subtract -$ TEMP1.OPD SUM3.OPD TEMP1.OPD
modify -$ TEMP1.OPD TEMP2.OPD -x %4
subtract -$ TEMP1.OPD TEMP2.OPD TEMP1.OPD -a
rescale -$ TEMP1.OPD AEE.OPD -s 0.25
if ERRORLEVEL 1 goto end modify -$ SUM1.OPD TEMP1.OPD -x %4
subtract -$ SUM1.OPD TEMP1.OPD TEMP1.OPD -a
rescale -$ AEE.OPD TEMP2.OPD -s 2
subtract -$ TEMP1.OPD TEMP2.OPD TEMP1.OPD
rescale -$ TEMP1.OPD BEE.OPD -s 0.5 modify -$ SUM2.OPD TEMP1.OPD -x %4
subtract -$ SUM2.OPD TEMP1.OPD TEMP1.OPD -a
rescale -$ AEE.OPD TEMP2.OPD -s 2
subtract -$ TEMP1.OPD TEMP2.OPD TEMP1.OPD
rescale -$ TEMP1.OPD CEE.OPD -s 0.5
if ERRORLEVEL 1 goto end rem ******************************************* Eq. (20) *******
subtract -$ AEE.OPD  Aoeeo.OPD AZ.OPD -a
if ERRORLEVEL 1 goto end
subtract -$ BEE.OPD  Boeeo.OPD BZ.OPD -a
if ERRORLEVEL 1 goto end
subtract -$ CEE.OPD  Coeeo.OPD CZ.OPD -a
if ERRORLEVEL 1 goto end modify -$ BZ.OPD TEMP1.OPD -x %4
subtract -$ M1.OPD TEMP1.OPD TEMP.OPD
subtract -$ TEMP.OPD AZ.OPD SUM1.OPD
if ERRORLEVEL 1 goto end
modify -$ BZ.OPD TEMP1.OPD -x %4
modify -$ AZ.OPD TEMP2.OPD -r 90 %4 %5
subtract -$ M3.OPD TEMP1.OPD TEMP.OPD
subtract -$ TEMP.OPD TEMP2.OPD SUM2.OPD
if ERRORLEVEL 1 goto end
modify -$ CZ.OPD TEMP1.OPD -x %4
subtract -$ M6.OPD TEMP1.OPD TEMP.OPD
subtract -$ TEMP.OPD BZ.OPD SUM3.OPD
if ERRORLEVEL 1 goto end rem *** SUM1=m1'   SUM2=m3'   SUM3=m6'
```

APPENDIX 1

```
copy TEMP.OPD AOO2W.OPD
copy TEMP.OPD BOO2W.OPD
copy TEMP.OPD COO2W.OPD
rem ****************************** FIND AOO2W, Eq. (22)
subtract -$ SUM1.OPD SUM2.OPD TEMP.OPD
rescale -$ TEMP.OPD AOO2W.OPD -s 0.5
if ERRORLEVEL 1 goto end
rem ******* rotate (m1') -90 degrees ****
modify -$ SUM1.OPD TEMP.OPD -r -90 %4 %5
if ERRORLEVEL 1 goto end
subtract -$ TEMP.OPD SUM2.OPD TEMP.OPD
rescale -$ TEMP.OPD BOO2W.OPD -s 0.5
if ERRORLEVEL 1 goto end
rem ******* rotate (m6') -90 degrees ****
modify -$ SUM3.OPD TEMP.OPD -r -90 %4 %5
if ERRORLEVEL 1 goto end
subtract -$ TEMP.OPD SUM3.OPD TEMP.OPD
rescale -$ TEMP.OPD COO2W.OPD -s 0.5
if ERRORLEVEL 1 goto end
subtract -$ COO2W.OPD BOO2W.OPD COO2W.OPD -a
if ERRORLEVEL 1 goto end rem **************************************** Eq. (23) *******
subtract -$ AZ.OPD AOO2W.OPD AZ.OPD -a
if ERRORLEVEL 1 goto end
subtract -$ BZ.OPD BOO2W.OPD BZ.OPD -a
if ERRORLEVEL 1 goto end
subtract -$ CZ.OPD COO2W.OPD CZ.OPD -a
if ERRORLEVEL 1 goto end modify -$ BZ.OPD TEMP1.OPD -x %4
subtract -$ M1.OPD TEMP1.OPD TEMP.OPD
subtract -$ TEMP.OPD AZ.OPD SUM1.OPD
if ERRORLEVEL 1 goto end
modify -$ BZ.OPD TEMP1.OPD -x %4
modify -$ AZ.OPD TEMP2.OPD -r 45 %4 %5
subtract -$ M4.OPD TEMP1.OPD TEMP.OPD
subtract -$ TEMP.OPD TEMP2.OPD SUM2.OPD
if ERRORLEVEL 1 goto end
modify -$ CZ.OPD TEMP1.OPD -x %4
subtract -$ M6.OPD TEMP1.OPD TEMP.OPD
subtract -$ TEMP.OPD BZ.OPD SUM3.OPD
if ERRORLEVEL 1 goto end rem *** SUM1=m1"   SUM2=m4"   SUM3=m6"
```

APPENDIX 1

```
copy TEMP.OPD A004W.OPD
copy TEMP.OPD B004W.OPD
copy TEMP.OPD C004W.OPD
rem ***************************************** FIND A004W, Eq. (25)
subtract -$ SUM1.OPD SUM2.OPD TEMP.OPD
rescale -$ TEMP.OPD A004W.OPD -s 0.5
if ERRORLEVEL 1 goto end
rem ****** rotate (m1") -45 degrees ****
modify -$ SUM1.OPD TEMP.OPD -r -45 %4 %5
if ERRORLEVEL 1 goto end
subtract -$ TEMP.OPD SUM2.OPD TEMP.OPD
rescale -$ TEMP.OPD B004W.OPD -s 0.5
if ERRORLEVEL 1 goto end
rem ****** rotate (m6") -45 degrees ****
modify -$ SUM3.OPD TEMP.OPD -r -45 %4 %5
if ERRORLEVEL 1 goto end
subtract -$ TEMP.OPD SUM3.OPD TEMP.OPD
rescale -$ TEMP.OPD C004W.OPD -s 0.5
if ERRORLEVEL 1 goto end
subtract -$ C004W.OPD B004W.OPD C004W.OPD -a
if ERRORLEVEL 1 goto end del TEMP?.OPD
del SUM?.OPD
rem ********************************************* Aoeeo+Aee+Aoo2w+A004W
subtract -$ AZ.OPD A004W.OPD AZ6.OPD -a
subtract -$ BZ.OPD B004W.OPD BZ6.OPD -a
subtract -$ CZ.OPD C004W.OPD CZ6.OPD -a copy ?Z6.OPD ?Z6N.OPD
del  ?z?.opd :end
echo on
```

What is claimed is:

1. A method of measuring absolute topographies of the entire surfaces of a plurality of flats using an interferometer system including an interferometer adapted to support two flats, a detection system, and a computer adapted to compute the OPD (optical path difference) between surfaces of the two flats, the interferometer including a detector array, each element of which corresponds to a pixel of an image of the flat within a field of view of the interferometer, the method comprising the steps of:

(a) supporting a first flat having a first surface and a second flat having a second surface in the interferometer with the second surface facing the first surface;

(b) operating the interferometer system to measure and store the OPDs between the first surface and the second surface for each pixel;

(c) rotating the first flat by a predetermined angle relative to its initial orientation in step (a) and then repeating step (b);

(d) repeating step (c) a number of times for an equal number of other angles, respectively:

$$m_1 = (M_1 + [M_1]^{180°})/2,$$
$$m_5 = (M_5 + [M_5]^{180°})/2,$$
$$m_6 = (M_6 + [M_6]^{180°})/2,$$
$$m_1' = M_1 - (A_{oe} + A_{oe} + A_{ee}) - [B_{oe} + B_{eo} + B_{ee}]^x,$$
$$m_3' = M_3 - [A_{oe} + A_{oe} + A_{ee}]^{90°} - [B_{oe} + B_{eo} + B_{ee}]^x,$$
$$m'6 = M_6 - (B_{oe} + B_{eo} + B_{ee}) - [C_{oe} + C_{eo} + C_{ee}]^x,$$
$$m_1'' = M_1 - (A_{oe} + A_{eo} + A_{ee} + A_{oo,2odd\theta}) - [B_{oe} + B_{eo} + B_{ee} + B_{oo,2odd\theta}]^x,$$
$$m_4'' = M_4 - [A_{oe} + A_{eo} + A_{ee} + A_{oo,2odd\theta}]^{45°} - [B_{oe} + B_{eo} + B_{ee} + B_{oo,2odd\theta}]^x,$$
$$m_6'' = M_6 - (A_{oe} + A_{eo} + A_{ee} + A_{oo,2odd\theta}) - [C_{oe} + C_{eo} + C_{ee} + C_{oo,2odd\theta}]^x,$$

(e) substituting a third flat having a third surface for the second flat, and operating the interferometer system to measure and store the OPDs between the first and third surfaces for each pixel,;

(f) replacing the first flat by the second flat oriented with the second surface facing the third surface and operating the interferometer system to measure and store the OPDs between the second and third surfaces for each pixel; and (g) operating the computer to solve first, second, and third equations for the absolute topographies of the entire first, second, and third surfaces of the first, second, and third flats, respectively, the first, second and third equations expressing the topographies of the corresponding first, second, and third surfaces of the first, second, and third flats, respectively, as a sum of even—even, odd–even, even–odd, and odd—odd parts in order to use the stored OPDs to compute the absolute topography of the entire first, second, and third surfaces, wherein the even—even parts have left–right symmetry and top–bottom symmetry, the odd–even parts have left–right anti-symmetry and top–bottom symmetry, the even–odd parts have left–right symmetry and top–bottom anti-symmetry, and the odd—odd parts have left–right anti-symmetry and top–bottom anti-symmetry.

2. The method of claim 1 wherein steps (c) and (d) include rotating the first flat 180°, 90°, and 45°, respectively, relative to its original position.

3. The method of claim 2 wherein the OPD measurements of steps (b) through (f) are designated $M_1$, $M_2$–$M_6$, respectively, and the first, second, and third equations are $$A \simeq A_{ee} + A_{oe} + A_{eo} + A_{oo,2odd\theta} + A_{oo,4odd\theta},$$
$$B \simeq B_{ee} + B_{oe} + B_{eo} + B_{oo,2odd\theta} + B_{oo,4odd\theta},$$
$$C \simeq C_{ee} + C_{oe} + C_{eo} + C_{oo,2odd\theta} + C_{oo,4odd\theta},$$

wherein A, B and C represent the profiles of the first, second, and third surfaces, respectively, and wherein the various even—even, even–odd, odd–even, and odd—odd components are $$A_{oe} + A_{eo} = (M_1 - M_2)/2,$$
$$B_{oe} + B_{eo} = [M_1 - [M_1]^{180°})/2 - (A_{oe} + A_{eo})]^x,$$
$$C_{oe} + C_{eo} = [M_5 - [M_5]^{180°})/2 - (A_{oe} + A_{eo})]^x,$$
$$A_{ee} = (m_1 + m_5 - m_6 + [m_1 + m_5 - m_6]^x)/4,$$
$$B_{ee} = (m_1 + [m_1]^x - 2A_{ee})/2,$$
$$C_{ee} = (m_5 + [m_5]^x - 2A_{ee})/2,$$
$$A_{oo,2odd\theta} = (m_1' - m_3')/2,$$
$$B_{oo,2odd\theta} = ([m_1']^{90°} - m_3')/2,$$
$$C_{oo,2odd\theta} = ([m_6']^{90°} - m_6')/2 + B_{oo,2odd\theta},$$
$$A_{oo,4odd\theta} = (m_1'' - m_4'')/2,$$
$$B_{oo,4odd\theta} = ([m_1'']^{45°} - m_4'')/2,$$
$$C_{oo,4odd\theta} = ([m_6'']^{45°} - m_6'')/2 + B_{oo,4odd\theta},$$

where

4. The method of claim 2 wherein the OPD measurements of steps (b) through (f) are designated $M_1$, $M_2$–$M_8$, respectively, and the first, second, and third equations are $$A \simeq A_{ee} + A_{oe} + A_{eo} + A_{oo,2odd\theta} + A_{oo,4odd\theta},$$
$$B \simeq B_{ee} + B_{oe} + B_{eo} + B_{oo,2odd\theta} + B_{oo,4odd\theta},$$
$$C \simeq C_{ee} + C_{oe} + C_{eo} + C_{oo,2odd\theta} + C_{oo,4odd\theta}.$$

wherein A, B and C represent the profiles of the first, second, and third surfaces, respectively, and wherein the odd–even components $A_{oe}$, $B_{oe}$, and $C_{oe}$ and the even–odd components $A_{eo}$, $B_{eo}$, and $C_{eo}$ are obtained from the equations $$A_{oe} + A_{eo} = (M_1 - M_2)/2,$$
$$B_{oe} + B_{eo} = [(M_1 - [M_1]^{180°})/2 - (A_{oe} + A_{eo})]^x,$$
$$C_{oe} + C_{eo} = [(M_5 - [M_5]^{180°})/2 - (A_{oe} + A_{eo})]^{180°}]^x,$$

and the even—even components $A_{ee}$, $B_{ee}$, and $C_{ee}$ are given by $$A_{ee} = (m_1 + m_5 - m_6 + [m_1 + m_5 - m_6]^x)/4,$$
$$B_{ee} = (m_1 + [m_1]^x - 2A_{ee})/2,$$
$$C_{ee} = (m_5 + [m_5]^x - 2A_{ee})/2,$$

where $$m_1 = (M_1 + [M_1]^{180°})/2,$$
$$m_5 = (M_5 + [M_5]^{180°})/2,$$
$$m_6 = (M_6 + [M_6]^{180°})/2,$$

and the odd—odd components $A_{oo}$, $B_{oo}$, and $C_{oo}$ are obtained from $$A_{oo,2odd\theta} = (m_1' - m_3')/2,$$
$$B_{oo,2odd\theta} = (m_6' - m_7')/2,$$
$$C_{oo,2odd\theta} = ([m_7']^{-90°} - m_6')/2,$$

where $$m_1' = A_{oo,2\theta} - B_{oo,2\theta},$$
$$m_3' = [A_{oo,2\theta}]^{90°} - B_{oo,2\theta},$$

$$m_6' = B_{oo,2\theta} - C_{oo,2\theta},$$
$$m_7' = [B_{oo,2\theta}]^{90°} - C_{oo,2\theta},$$

and $$A_{oo,4odd\theta} = (m_1'' - m_3'')/2,$$
$$B_{oo,4odd\theta} = (m_6'' - m_7'')/2,$$
$$C_{oo,4odd\theta} = ([m_8'']^{-45°} - m_6'')/2,$$

where $$m_1'' = A_{oo,4\theta} - B_{oo,4\theta},$$
$$m_4'' = [A_{oo,4\theta}]^{45°} - B_{oo,4\theta},$$
$$m_6'' = B_{oo,4\theta} - C_{oo,7\theta},$$
$$m_8'' = [B_{oo,4\theta}]^{45°} - C_{oo,4\theta}.$$

5. The method of claim 3 wherein the predetermined angle of step (c) is 180° counterclockwise from the initial orientation of the first flat, and the number of times in step (d) is two, and the other angles are 90° and 45°, respectively.

6. The method of claim 1 wherein the number of times in step (d) is zero and wherein the OPD measurements of steps (b) through (f) are designated $N_1$, $N_4$, $N_2$, and $N_3$, respectively, and the first, second, and third equations are $$A = A_{ee} + A_{oe} + A_{eo} + A_{oo,2odd\theta} + A_{oo,4odd\theta},$$
$$B = B_{ee} + B_{oe} + B_{eo} + B_{oo,2odd\theta} + B_{oo,4odd\theta},$$
$$C = C_{ee} + C_{oe} + C_{eo} + C_{oo,2odd\theta} + C_{oo,4odd\theta}.$$

wherein A, B and C represent the profiles of the first, second, and third surfaces, respectively, and wherein the even—even components $A_{ee}$, $B_{ee}$, and $C_{ee}$, and the even–odd components $A_{eo}$, $B_{eo}$, and $C_{eo}$, are obtained from the equations $$A_{ee} + A_{eo} = \{[N_1]^x + N_2 - N_3\}/2,$$
$$B_{ee} + B_{eo} = (N_1 - N_2 + N_3)/2,$$
$$C_{ee} + C_{eo} = \{-N_1 + N_2 + [N_3]^x\}/2,$$

and wherein the odd–even components are given by the equations $$A_{oe} = (N_1 - N_6)/2 + \{[[N_1]^x + N_2 - N_3]^{180°}\}/4 -$$
$$\{[N_1]^x + N_2 - N_3\}/4,$$

$$A_{oe} = (N_1 - N_6)/2 + \{[N_1 + N_2 - N_3]^{180°}\}/4 -$$
$$[N_1 + N_2 - N_3]/4,$$

$$C_{oe} = (N_1 - N_6)/2 + \{[N_1 + N_2 - [N_3]^x]^{180°}\}/4 -$$
$$\{N_1 + N_2 - [N_3]^x\}/4,$$

where $$N_5 = [N_4 - N_1]^{45°} + N4,$$
$$N_6 = [N_5 - N_1]^{90°} + N5,$$

and wherein the odd—odd components $A_{oo}$, $B_{oo}$, and $C_{oo}$ are obtained from the equations $$A_{oo,2odd\theta} = (N_1 - N_5)/2 + \{[[N_1]^x + N_2 - N_3]^{90°}\}/4 -$$
$$\{[N1]^x + N_2 - N_3\}/4 + \{[A_{oe}]^{90°} - A_{oe}\}/2,$$

$$B_{oo,2odd\theta} = (N_1 - N_5)/2 + \{[N_1 + N_2 - N_3]^{90°}\}/4 -$$
$$(N1 + N_2 - N_3)/4 + \{[B_{oe}]^{90°} - B_{oe}\}/2,$$

$$C_{oo,2odd\theta} = (N_1 - N_5)/2 + \{[N_1 + N_2 - [N_3]^x]^{90°}\}/4 -$$
$$\{N_1 + N_2 - [N_3]^x\}/4 + \{[C_{oe}]^{90°} - C_{oe}\}/2,$$

$$A_{oo,4odd\theta} = (N_1 - N_4)/2 + \{[[N_1]^x + N_2 - N_3]^{45°}\}/4 -$$
$$\{[N1]^x + N_2 - N_3\}/4 + \{[A_{oe}]^{45°} - A_{oe}\}/2 +$$
$$\{[A_{oo,2odd\theta}]^{45°} - A_{oo,2odd\theta}\}/2,$$

$$B_{oo,4odd\theta} = (N_1 - N_4)/2 + \{[N_1 + N_2 - N_3]^{45°}\}/4 -$$
$$(N_1 + N_2 - N_3)/4 + \{[B_{oe}]^{45°} - B_{oe}\}/2 +$$
$$\{[B_{oo,2odd\theta}]^{45°} - B_{oo,2odd\theta}\}/2,$$

$$C_{oo,4odd\theta} = (N_1 - N_4)/2 + \{[N_1 + N_2 - N_3]^{45°}\}/4 -$$
$$(N_1 + N_2 - N_3)/4 + \{[B_{oe}]^{45°} - B_{oe}\}/2 +$$
$$\{[C_{oo,2odd\theta}]^{45°} - C_{oo,2odd\theta}\}/2,$$

7. A system for measuring absolute topographies of the entire surfaces of a plurality of flats using an interferometer system including an interferometer adapted to support two flats, a detection system, and a computer adapted to compute the OPD (optical path difference) between surfaces of the two flats, the interferometer including a detector array, each element of which corresponds to a pixel of an image of the flat within a field of view of the interferometer, the system comprising in combination:

(a) means for supporting a first flat having a first surface and a second flat having a second surface in the interferometer with the second surface facing the first surface;

(b) means for operating the interferometer system to measure and store the OPDs between the first surface and the second surface for each pixel;

(c) means for rotating the first flat by a predetermined angle relative to its initial orientation;

(d) means for operating the interferometer system to measure and store, for each pixel, the OPDs between the first surface and a surface of a third flat, the third flat being substituted for the second flat;

(e) means for operating the interferometer system to measure and store, for each pixel, the OPDs between the surface of the third flat and the second surface of the second flat, the second flat being substituted for the first flat; and (f) means for operating the computer to solve first, second, and third equations for the absolute topographies of the entire first, second, and third surfaces of the first, second, and third flats, respectively, the first, second and third equations expressing the topographies of the corresponding first, second, and third surfaces of the first, second, and third flats, respectively, as a sum of even—even, odd–even, even–odd, and odd—odd parts in order to use the stored OPDs to compute the absolute topographies of the entire first, second, and third surfaces, wherein the even—even parts have left–right symmetry and top–bottom symmetry, the odd–even parts have left–right anti-symmetry and top–bottom symmetry, the even–odd parts have left–right symmetry and top–bottom anti-symmetry, and the odd—odd parts have left–right anti-symmetry and top–bottom anti-symmetry.

8. A method of measuring absolute topographies of the entire surfaces of a plurality of flats using an interferometer system including an interferometer adapted to support two flats, a detection system, and a computer adapted to compute the OPD (optical path difference) between surfaces of the two flats, the interferometer including a detector array, each element of which corresponds to a pixel of an image of the flat within a field of view of the interferometer, the method comprising the steps of:

(a) supporting a first flat having a first surface and a second flat having a second surface in the interferometer with the second surface facing the first surface;

(b) operating the interferometer system to measure and store the OPDs between the first surface and the second surface for each pixel;

(c) substituting a third flat having a third surface for the second flat, and operating the interferometer system to measure and store the OPDs between the first and third surfaces for each pixel;

(d) replacing the first flat by the second flat oriented with the second surface facing the third surface and operating the interferometer system to measure and store the OPDs between the second and third surfaces for each pixel; and (e) operating the computer to solve first, second, and third equations for the absolute topographies of the entire first, second, and third surfaces of the first, second, and third flats, respectively, the first, second and third equations expressing the topographies of the corresponding first, second, and third surfaces of the first, second, and third flats, respectively, as a sum of even—even, odd–even, even–odd, and odd—odd parts in order to use the stored OPDs to compute the absolute topographies of the entire first, second, and third surfaces, wherein the even—even parts have left–right symmetry and top–bottom symmetry, the odd–even parts have left–right anti-symmetry and top–bottom symmetry, the even–odd parts have left–right symmetry and top–bottom anti-symmetry, and the odd—odd parts have left–right anti-symmetry and top–bottom anti-symmetry.

* * * * *